United States Patent
Srinivas et al.

(10) Patent No.: US 9,823,134 B1
(45) Date of Patent: Nov. 21, 2017

(54) BURN SAVER DEVICE

(71) Applicant: TDA Research, Inc., Wheat Ridge, CO (US)

(72) Inventors: Girish Srinivas, Broomfield, CO (US);
Michael Karpuk, Boulder, CO (US);
Steven Gebhard, Golden, CO (US);
Joe Fredrickson, Brighton, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 527 days.

(21) Appl. No.: 14/523,516

(22) Filed: Oct. 24, 2014

Related U.S. Application Data

(60) Provisional application No. 61/895,322, filed on Oct. 24, 2013.

(51) Int. Cl.
*G01J 5/12* (2006.01)
*G01J 5/00* (2006.01)
*G01K 17/00* (2006.01)
*G01K 7/02* (2006.01)
*G01J 5/02* (2006.01)

(52) U.S. Cl.
CPC . *G01K 7/02* (2013.01); *G01J 5/02* (2013.01)

(58) Field of Classification Search
CPC .......... G01K 17/20; G01K 17/00; G01K 7/02; G01K 1/16; G01K 7/42; G01J 5/12; G01N 25/18
USPC ..... 73/204.23; 374/1, 29, E17.001, E17.004, 374/179; 702/130, 136; 257/497
See application file for complete search history.

(56) References Cited

U.S. PATENT DOCUMENTS

| | | | |
|---|---|---|---|
| 6,367,970 B1 * | 4/2002 | Danielson | G01K 13/02 374/179 |
| 2005/0090738 A1 * | 4/2005 | Black | A61N 5/1048 600/436 |

OTHER PUBLICATIONS

Amon, F. et al. "Thermal Imaging in Firefighting . . . " in Experimental Methods in the Physical Sciences, 43, 279-331(2010).
Barron, W.R. et al. "Prinicples of Infrared Thermometry" Omega Engineering (1999).
Bryner, N. "Performance of thermal exposure sensors in Personal Alert Safety System (PASS) devices . . . " NISTIR 7294, NIST.DHS report. (2005).
Donnely, M.K. "Thermal environment of electronic equipment used by first responders" NIST Technical Note 1474, Jan. (2006).
Hess (2001) "High emissivity testing of materials used in IR long-wavelength targets" Max Levy Autograph Inc.
Kasap, S.O. "thermoelectric effect in metals: thermocouples" (1997) ebooklet availavle online at www.kasap.usask.ca/samples/Thermoelectric-Seebeck.pdf.
Mensch, A. et al."Fire exposure of fire fighter self-contained breathing apparatus facpeice lenses" NIST Technical Note 1724, Nov. 2011.

* cited by examiner

*Primary Examiner* — Toan Le
*Assistant Examiner* — Jeffrey Aiello
(74) *Attorney, Agent, or Firm* — Brian J. Elliott

(57) ABSTRACT

A decoupling radiant and convective heat sensing device, and a decoupling radiant and convective heat sensing device with a means for performing calculations and then determining a heat flux and an ambient temperature using formulas or reference tables, and also with a means for alerting a person of hazardous fire conditions based on a calculated heat flux and ambient temperature.

2 Claims, 37 Drawing Sheets

- Class I – Air temperatures of 50-212°F
  - Heat fluxes of 0.1 – 1 kW/m²
  - Routinely encountered; can work for ~25 min.
- Class II – Air temperatures of 212-320°F
  - Heat fluxes of 1.0 – 2.0 kW/m²
  - Routinely encountered
  - limited exposure of ~15 minutes
- Class III – Air temperatures of 320-500°F
  - Heat fluxes of 2.0 – 10.0 kW/m²
  - Limited exposure of <5 minutes
  - Upper limit of NFPA standards for PPE ensembles
- Class IV – Air temperatures of 500-1832°F
  - Heat fluxes of 10 – 100 kW/m²
  - Firefighters need to IMMEDIATELY retreat
  - PPE failure

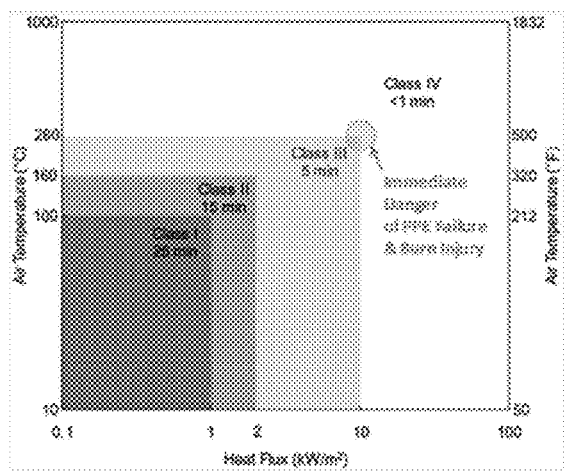

- Donnelly, M.K.; Davis, W.D.; Lawson, J.R.; Selepak, M.J. (2006) "Thermal Environment of Electronic Equipment Used by First Responders" NIST Technical Note 1474, January.
- Mensch, A.; Braga, G.; Bryner, N. (2011) "Fire Exposures of Fire Fighter Self-Contained Breathing Apparatus Facepiece Lenses" NIST Technical Note 1724, November.

Figure 2

| Material | Seebeck Coeff. | Material | Seebeck Coeff. | Material | Seebeck Coeff. |
|---|---|---|---|---|---|
| Aluminum | 3.5 | Gold | 6.5 | Rhodium | 6 |
| Antimony | 47 | Iron | 19 | Selenium | 900 |
| Bismuth | -72 | Lead | 4 | Silicon | 440 |
| Cadmium | 7.5 | Mercury | 0.6 | Silver | 6.5 |
| Carbon | 3 | Nichrome | 25 | Sodium | -2 |
| Constantan | -35 | Nickel | -15 | Tantalum | 4.5 |
| Copper | 6.5 | Platinum | 0 | Tellurium | 500 |
| Germanium | 300 | Potassium | -9 | Tungsten | 7.5 |

Figure 8

Maximum Service Temperature                                                        Table 1

| Thermocouple Type | 0.13 mm (0.005") | 0.38 mm (0.015") | 0.51 mm (0.020") | 0.81 mm 0.032 |
|---|---|---|---|---|
| J* | 315°C (600°F) | 371°C (700°F) | 371°C (700°F) | 482°C (900°F) |
| K | 593°C (1100°F) | 871°C (1600°F) | 871°C (1600°F) | 982°C (1800°F) |
| N | 593°C (1100°F) | 871°C (1600°F) | 871°C (1600°F) | 982°C (1800°F) |
| T | 149°C (300°F) | 204°C (400°F) | 204°C (400°F) | 260°C (500°F) |
| E | 315°C (600°F) | 426°C (800°F) | 426°C (800°F) | 593°C (1100°F) |
| R,S | — | — | 1450°C (2642°F) | 1450°C (2642°F) |
| B | — | — | 1700°C (3092°F) | 1700°C (3092°F) |

Table 1 lists maximum service temperatures for long term exposures of bare wire thermocouples. For very short exposure times, temperatures of the fine gage thermocouples can be as high as the permissible temperatures for the 0.8 mm (0.032") diameter thermocouples.
** Do not expose to oxidizing atmospheres.

Response Time*                                                     Table 2

| Wire Size mm (in) | Still Air 427°C/38°C 800°F/100°F | 60 ft/sec Air 427°C/38°C 800°F/100°F | Still H$_2$O 93°C/38°C 200°F/100°F |
|---|---|---|---|
| 0.025 (0.001) | 0.05 sec | 0.004 sec | 0.002 sec |
| 0.125 (0.005) | 1.0 sec | 0.08 sec | 0.04 sec |
| 0.381 (0.015) | 10.0 sec | 0.80 sec | 0.40 sec |
| 0.75 (0.032) | 40.0 sec | 3.2 sec | 1.6 sec |

* The time constant is defined as the time required to reach 63.2% of an instantaneous temperature change. The data for Table 2 are obtained by measuring the time required for a Type J fine gage thermocouple to reach 63.2% of its final temperature when its junction is alternately exposed to two different temperature levels. In this case, the time constant was measured for exposures between 427°C (800°F) and 38°C (100°F) air between 93°C (200°F) and 38°C (100°F) water.

Figure 9

| HEAT OPTION TYPICAL RESPONSE | |
|---|---|
| Environment Temperature | Alarm Response Time |
| 350° F | 6 minutes |
| 300° F | 7 minutes |

Fig. 12

| Chemical Name | CAS Number | Weight % Less Than |
|---|---|---|
| Mineral Spirits | 64742-88-7 | 40.0 |
| Iron Manganese Oxide | 68186-94-7 | 25.0 |
| Magnesium Silicate | 14807-96-6 | 10.0 |
| Copper Chromite Black | 68186-91-4 | 5.0 |
| Ethylbenzene | 100-41-4 | 1.0 |

Figure 30

$Q_S$ = Heat entering small detector = $\varepsilon\sigma A_S(T_S^4) + h_S A_S(T_S - T_A) + K_S A_S(T_S - T_D)$ $Q_L$ = Heat entering large detector = $\varepsilon\sigma A_L(T_L^4) + h_L A_L(T_L - T_A) + K_L A_L(T_L - T_D)$ $T_A$ = Ambient temperature $\varepsilon$ = Emissivity of coating on foils ≅ 0.94

$\sigma$ = Stefan Boltzman constant = $5.67 \times 10^{-8}$ $W/m^2 K^4$ $T_L$ = Temperature of larger detector (K)

$T_S$ = Temperature of smaller detector (K)

$T_D$ = Temperature of detector housing (K)

$K_L$ = Conduction coefficient for larger detector ($kA_{wire}/L_{wire}A_L$)

$K_S$ = Conduction coefficient for smaller detector ($kA_{wire}/L_{wire}A_S$)

$h_L$ = Convection coefficient for larger detector ($W/m^2K$)

$h_S$ = Convection coefficient for smaller detector ($W/m^2K$)

Figure 34

BURN SAVER DEVICE

CROSS REFERENCE TO RELATED APPLICATIONS

The present application claims the benefit of the provisional application No. 61/895,322 filed Oct. 24, 2013 (titled BURN SAVER DEVICE, by Girish Srinivas, Michael Karpuk, Steven Gebhard and Joe Fredrickson, which is incorporated by reference herein. Provisional application No. 61/895,322 is not admitted to be prior art with respect to the present invention by its mention in the background or cross-reference section.

STATEMENT REGARDING FEDERALLY SPONSORED RESEARCH OR DEVELOPMENT

This invention was made using U.S. government funding through the U.S. Department of Homeland Security contract HSHQDC-13-C-00042. The government has certain rights in this invention.

BACKGROUND

Firefighting personnel need to know when the environment they are operating in is too hot for their personal protective equipment (PPE). Often, it is the face piece of the Self Contained Breathing Apparatus (SCBA) that is the first component to fail in a high temperature environment, which can lead to catastrophic accidents (FIG. 1).

Mensch et al. 2011, Donnelly et al. 2006 have classified fires based on the surrounding air temperature and radiative heat flux to which the firefighter is exposed (FIG. 2). Class I fires have air temperatures of 10-100° C. (50-212° F.) with heat fluxes of 0.1-1 kW/m$^2$ (whichever comes first). Class I fires are routinely encountered and one can work for about 25 min under these conditions while wearing ordinary PPE (turnout gear and SCBA). Class II fires are more serious with air temperatures of 100-160° C. (212-320° F.) and/or heat fluxes of 1.0-2.0 kW/m$^2$, and while routinely encountered, exposure is limited to about 15 min. Class III fires are dangerous and less than 5 min should be spent in a Class III fire; temperatures are on the order of 160-260° C. (320-500° F.) with heat fluxes of 2.0-10.0 kW/m$^2$. Class IV fires are extremely dangerous and represent conditions that can be lethal. The temperatures that accompany Class IV fires are at least 260° C. (500° F.) and can be as high as 1000° C. (1832° F.) if a flash over occurs. Heat fluxes of at least 10 kW/m$^2$ are present, and have been measured to be as high as 100 kW/m$^2$ during a flashover. Because flashovers are practically impossible to predict with any significant lead time, immediate withdrawal is required when Class IV conditions are detected. Under Class IV conditions, the firefighter's PPE will rapidly fail, in particular the faceplate of the SCBA, which is made from high-temperature polycarbonate that has a maximum operating temperature of about 200° C.

A general problem is that modern PPE is so effective at protecting firefighters that it is difficult for them to know if the external environment has become dangerous until it may be too late. To address this issue a Personal Alert Safety System (PASS) devices can incorporate temperature detectors. Unfortunately, the response time of these devices is too slow to be useful (in some cases tens of minutes) since temperatures and radiant heat fluxes can change in a matter of seconds.

Heat is transferred to the firefighter (and his/her PPE) by three different mechanisms: convection, radiation and conduction. Convective heat transfer is important because it can cause failure in the firefighter's PPE. In the context of firefighting, convection transfers energy by contact of heated air with the PPE that is at a lower temperature. The general expression for the net heat flux (Btu/ft$^2$/hr) is given by Equation 1, where $h_{conv}$ is the convective heat transfer coefficient, a proportionality constant, that has a value that depends on the geometry of the object being heated (or cooled), its orientation relative to the direction of air flow, and the velocity of the air. Either direct measurement or semi-empirical correlations can used to determine the value of $h_{conv}$. In free convection, fluid flow causes heat transfer as a result of buoyancy differences in the fluid adjacent to the object when there is a difference between the object's surface temperature and the temperature of the fluid. Since the fluid velocity is relatively low, free convection heat transfer coefficients tend to be low (e.g. h~5-50 W/m$^2$K). In forced convection, the fluid flows much faster and the heat transfer coefficients can be much larger (e.g. 50-2500 w/m$^2$K).

Equation 1. Heat flux by convection:

$$q/A = h_{conv}\Delta T = h_{conv}(T_2 - T_1)$$

The most dangerous source of heat in a fire is infrared (IR) radiation and the greatest amount of its energy comes from flame emission. Since IR is electromagnetic radiation and travels at the speed of light, changes in IR emission are felt as quickly as the source temperature changes. The wavelengths which carry the most energy at fire temperatures are between $\lambda=0.25$ μm and $\lambda=6$ μm. The energy of electromagnetic (EM) radiation $E_\lambda$, in terms of wavelength is given by Equation 2, where h is Planck's constant (6.62×10$^{-34}$ m$^2$ kg/s), $\lambda$ is the wavelength in meters, and c is the speed of light in vacuum (3×10$^8$ m/s). With these units $E_\lambda$ is in Joules.

Equation 2. EM energy as a function of wavelength:

$$E_\lambda = \frac{h_{Plank} C}{\lambda}$$

The wavelength corresponding to the highest energy emitted by a hot object depends on its temperature and obeys Plank's radiation law (FIG. 3), which is described by Equation 3, where $k_B$ is Boltzmann's constant ($k_B$=1.380× 10$^{-23}$ m$^2$ kg/s$^2$/K) (Bird et al. 1960). While this equation applies only for a perfect radiator (i.e. a blackbody) it illustrates why wavelengths between 0.25 μm and 6 μm are the most dangerous for firefighters; S($\lambda$) is at its maximum at these wavelengths at typical fire temperatures (FIG. 4).

Equation 3. Plank's law for intensity [S($\lambda$)] as a function of source temperature (T)

$$S(\lambda) = \frac{2\pi c^2 h}{\lambda^5} \frac{1}{e^{\frac{hc}{\lambda k_B T}} - 1}$$

Unlike convection and conduction where the driving force for heat transfer is the linear difference between the hot and cold temperatures (i.e. $\Delta T = T_{hot} - T_{cold}$), the driving force for radiative heat transfer is $(T_h^4 - T_c^4)$, which makes small increases in the source temperature ($T_h$) have a large effect on the amount of energy radiated. The net radiative heat flux is given by Equation 4, where F is the view (configuration) factor, $\sigma$ is the Stefan-Boltzmann constant ($\sigma$=5.67×10$^{-8}$ W/m$^2$/K$^4$) and $\epsilon$ is the emissivity.

Equation 4. Thermal radiation heat flux.

$$q/A = h_{conv}\Delta T = h_{conv}(T_2 - T_1)$$

Emissivity ($\epsilon$) is one an important quantity in radiation heat transfer because it determines how efficiently radiant energy is absorbed. For objects that differ from a blackbody only in the percentage of radiation absorbed or emitted an each wavelength are called graybodies and have emissivities of $\epsilon < 1$. The emissivities listed in various tables for different materials are usually hemispherical emissivities which represent the average emissivity over all wavelengths at all angles from a surface and require that none of the radiation be reflected (i.e. no shiny surfaces).

A true blackbody is a theoretical object that is a perfect absorber and emitter of electromagnetic radiation at all wavelengths and is described by Equation 3. Real surfaces have molecules with chemical bonds that absorb and radiate electromagnetic energy in accord with their rotational, vibrational and electronic energy levels, which obey quantum mechanics and therefore occur at discrete wavelengths (see FIG. 4 for $CO_2$ and $H_2O$ at lower temperatures). The two best examples relevant in fires are water and $CO_2$ which emit in discrete bands. The soot (unburned carbonaceous particles) glows and provides most of the graybody radiation upon which the molecular radiation is superimposed. FIG. 4 shows that the higher the temperature, the more the curve of energy vs. wavelength approaches the shape of a blackbody emitter because emission from soot dominates the IR emission. At lower temperatures radiation from water, $CO_2$, CO and other molecules dominates the emission and occurs at specific wavelengths.

Heat conduction occurs when there is a temperature gradient within a substance, regardless of whether it is a solid, liquid or gas. Calculating the temperature gradient in a solid as a function of time (i.e. transient heating) requires solving (Equation 5) which gives T(x,y,z,t) and in most cases numerical methods are used for complex geometries. For materials that are thin in the direction of heat conduction, simplifying assumptions can be made if the temperature gradient through the material (for example a foil) is negligible that reduce the transient heat conduction problem to algebra.

Equation 5. Heat equation for conduction in 3-dimensions:

$$\frac{\partial T}{\partial t} = \left(\frac{k}{\rho C p}\right)\nabla^2 T = \left(\frac{k}{\rho C p}\right)\left(\frac{\partial^2 T}{\partial x^2} + \frac{\partial^2 T}{\partial y^2} + \frac{\partial^2 T}{\partial z^2}\right)$$

If the foil is thick, the heat equation (Equation 5) would need to be solved because the surface facing the IR radiation source would be significantly hotter than the back side where the thermocouple is attached. However, thin foils are easily analyzed using a so-called lumped capacitance thermal model (Incropera and Dewitt 1985). In this case, temperature gradients can be ignored when the Biot number is Bi<<1 (Equation 6). This situation is illustrated in FIG. 5.

Equation 6. Biot number:

$$Bi = \frac{h_{rad}L}{k}$$

The Biot number is a dimensionless number that represents the ratio of heat transfer into the object ($h_{rad}L$) divided by the thermal conductivity of the material (k), where $h_{rad}$ is the heat transfer coefficient and L is the thickness. In the case of heating by convection, the heat transfer coefficient ($h_{conv}$) for forced or free convection is used. For radiation, the concept of a heat transfer coefficient as a simple proportionality constant (as in Equation 1) has to be modified because the driving force for radiation depends on ($T_h^4 - T_c^4$) instead of $\Delta T$. This problem can be circumvented by deriving an approximate heat transfer coefficient for radiation using the first term in a Taylor series expansion of $\sigma\epsilon(T_h^4 - T_c^4)$, which gives $h_{rad} = 4\sigma\epsilon T_h^3$, where the source temperature ($T_h$) is used. In the lumped capacitance model, the system is described by a time constant, which is given by Equation 7.

Equation 7. Thermal time constant for lumped capacitance model:

$$\tau = \frac{mC_p}{h_{rad}A}$$

Equation 8. Predicted temperature response for a free standing foil IR sensing element neglecting heat losses ($T_\infty$ is the temperature of the IR source and $T_i$ is the starting temperature of the foil).

$$T(t) = (T_i - T_\infty)e^{\frac{-t}{\tau}} + T_\infty$$

Resistance temperature detectors (RTD) use a fine wire through which a constant current flows while the resistance is measured. The resistance of most metals increases with temperature (due to increased scattering of conduction electrons by lattice vibrations). The RTD can be calibrated to be extremely sensitive to small temperature changes. The fine wire is usually wrapped around a ceramic or glass core that is surrounded by a sheath to protect it from damage. One of the reasons that RTDs are popular in the process industries is that they are relatively immune to extraneous electrical noise and are stable. Common metals used in RTDs include Pt, Ni, Cu, and W.

Thermistors work by measuring the resistance of a semiconductor that has a constant current flow (similar to the RTD). Thermistors excel when precise measurements of low to moderate temperatures are required. In contrast to the RTD, as the temperature of a thermistor increases the resistance decreases because electrons from the valance band (or doping level) are thermally promoted into the conduction band, which increases the number of charge carriers, and reduces the electrical resistance. As with the RTD, the thermistor requires a very stable constant current source, and because semiconductors are used, these devices are usually limited to operating temperatures around 100° C.

IR thermometers use semiconductors such as PbS, Ge, Si, InAs, and InSb, which have narrow windows of wavelengths to which they respond. For example, the most sensitive detector (lead sulfide) detects radiation between 0.7 µm-3 µm. Indium antimonide (InSb) has a somewhat broader ranger (1-10 µm). Because all of the semiconductor based detectors have limited bandwidth responses and because these responses are highly nonlinear with wavelength (FIG. 7), semiconductor based IR detectors generally measure the intensity of radiation at one (or sometimes two) wavelengths and then fit the measured intensity to a graybody curve (which corresponds to a particular temperature) that has an assumed emissivity (which is selected on better instruments). The big advantage of semiconductor IR detectors is that they are very sensitive and when the emissivity of the emitter is known, can be very accurate (0.1-0.5%). The disadvantages are that they not mechanically robust, cannot tolerate high temperatures (like thermistors), require complex signal processing electronics and are relatively expensive.

Thermocouples are simple devices that rely on the difference in potentials (voltages) that exist in two different metals as a result of a temperature gradient. Metals are good electrical conductors because they have electrons that are more or less free to move through the crystal lattice under the influence of a potential. When a wire has temperatures that are different at each end, electrons will diffuse from the hot end to the cold end establishing an opposing internal potential that eventually stops the diffusion. The development of an internal potential in a metal that has a temperature gradient is called the Seebeck effect. In metals where the conduction electrons exhibit nearly "free-electron" behavior (Al, Mg, alkalis, etc.) electrons diffuse toward the cold end and such metals have negative Seebeck coefficients (FIG. 8). In other metals, the free electron picture does not really apply and it appears as if the electrons diffuse toward the hot end leading to positive Seebeck coefficients (Kasap 1997).

The sensitivity of this potential to temperature is termed the Seebeck coefficient (Equation 9). There is no way to measure this potential without completing a circuit, so in a thermocouple, a second wire with a different Seebeck coefficient is used for this purpose. The resulting voltage difference between the metals is given by (Equation 10)

Equation 9. Seebeck coefficient:

$$S_{Seebeck} = \frac{dV}{dT}$$

Equation 10. Thermocouple voltage resulting from the different Seebeck coefficients of two dissimilar metals:

$$V_{AB} = \int_{T_O}^{T} (S_A - S_B) dT$$

In most diagrams, a thermocouple is drawn as if it were attached to the test specimen with the wires joined together at a point because spot welding the wires together is the easiest way to make a thermocouple (FIG. 10 left). It should be pointed out however, that the junction has nothing to do with generating the voltage $V_{AB}$; rather it is the difference in Seebeck coefficients of the two metals (Equation 10). Therefore, a thermocouple can be made where both wires are attached to another conductor and the temperature measurements will be accurate so long as the ends attached to the conductor are at the same temperature (FIG. 10 right). FIG. 9 shows specifications for various fine wire thermocouples and their thermal response times.

It is difficult to simultaneously measure the IR flux and ambient air temperature. Measuring the IR flux and ambient air temperature independently is more difficult than it first appears to be simply for the reasons that thermocouples, thermistors and RTDs are all heated by infrared radiation and heated and cooled by convection depending on the temperatures of the air and temperature sensing device.

The dirty environment or a fire causes problems on devices that rely on clean metal surfaces. For example, soot and ash can coat shiny metal surfaces (low emissivity materials), changing their emissivity.

Aspirated thermocouples can measure air temperatures in buildings during fire. In an aspirated TC, the TC is surrounded by a radiation shield and air is forced over the thermocouple at a high velocity. In effect, this increases the forced convection heat transfer to be large enough that convective controls the TC temperature. This approach suffers from the limitation that it is not suitable for applications where the firefighter has to wear the device because of the weight, complexity and mechanical unreliability of having to have a pump or heavy fan to generate air velocities upwards of 100 m/s.

SuperPASS™ 3 is a commercial-off-the-shelf sensor. PASS devices equipped with a temperature sensor exhibit very slow thermal responses (5-10 min) (FIG. 11 and FIG. 12).

These references contain at least one of the following limitations in regard to a portable burn warning device: inability to accurately measure (simultaneously) infrared radiation and convective heat, inability to work in the dirty fire environment, excessive weight, complexity, or mechanical unreliability.

There remains a need in the art for a fast responding temperature sensor that accurately responds to both infrared (IR) radiation and convective heating threats, that can be placed on or near the helmet (close to the SCBA face piece) to provide the firefighter with a warning before high temperatures can cause PPE failure.

BRIEF SUMMARY OF THE INVENTION

The present invention relates to a Burn Saver device and solves the limitations of the prior art. The present invention also relates to a durable, helmet-mounted Burn Saver device that has sensory (audible, visual or vibratory) alarms to alert firefighters when a firefighter is in an environment that is too hot for the firefighter's personal protective equipment (PPE) to provide adequate protection.

An embodiment of the present invention is a decoupling radiant and convective heat sensing device 100, comprising: a first sensor 110, wherein the first sensor is a thin, high thermal conductivity body, and wherein the first sensor has a first surface area 115, an obverse side 111, a reverse side 112, a mass and a heat capacity; a first high emissivity surface coating 113 on the obverse side of the first sensor; a first thermocouple 114 operably connected to reverse side of the first sensor; a second sensor 120, wherein the second sensor is a thin, high thermal conductivity body, and wherein the second sensor has a second surface area 125, a second sensor obverse side 121 a second sensor reverse side 122, a second sensor mass and a second sensor heat capacity; a second high emissivity surface coating 123 on the obverse side of the second sensor; a second thermocouple 124 operably connected to reverse side of the second sensor; wherein, and the first surface area is larger than the second surface area, and wherein the first sensor and the second sensor are mechanically coupled.

An additional embodiment also further comprises: a processor 130; and an alarm 140, wherein the first thermocouple 114, the second thermocouple 124 and the alarm 140 are operably connected to the processor 130.

Another embodiment of the present invention is a decoupling radiant and convective heat sensing device 200, comprising: a first sensor 210, wherein the first sensor is a thin, high thermal conductivity body, and wherein the first sensor has a first surface area 215, an obverse side 211, a reverse side 212; a first high emissivity surface coating 213 on the obverse side of the first sensor; a first thermocouple 214 operably connected to reverse side of the first sensor; a second sensor 220, wherein the second sensor is a thin, high thermal conductivity body, and wherein the second sensor has a second surface area 225, an obverse side 221, a reverse side 222; a second high emissivity surface coating 223 on the obverse side of the second sensor; a second thermocouple 224 operably connected to reverse side of the second sensor; wherein, the first surface area is larger than the second surface area, and wherein the first sensor and second sensor are mechanically coupled; a means of measuring the temperature output 150 from the first thermocouple and the second thermocouple; a means of performing calculations 160 comprising calculating the rate of temperature change for both the first thermocouple and second thermocouple and then determining the heat flux and the ambient temperature using formulas or reference tables; and a means of alerting a person 170 of hazardous fire conditions based on the calculated heat flux and ambient temperature.

In a preferred embodiment the first high emissivity coating and the second high emissivity coating have essentially the same emissivity, and wherein the means of performing calculations comprises the equation (equation 18):

$$T_A = \frac{\varepsilon\sigma(T_L^4 - T_S^4) - h_S T_S + h_L T_L}{(h_L - h_S)}$$

wherein, $T_A$ is the ambient temperature, $\varepsilon$ is the emissivity of first and second high emissivity coating, $\sigma$ is the Boltzmann constant, $T_L$ is the temperature of the first sensor, $T_S$ is the temperature of the second sensor, $h_S$ is the thermal conductivity of the second sensor, $h_L$ is the thermal conductivity of the first sensor.

In another embodiment $h_S$ and $h_L$ are constants.

In another embodiment $h_S$ and $h_L$ are determined by a means of calculating comprising a look-up table and an iterative calculation.

In a preferred embodiment the heat flux is calculated by the means of performing calculations using the rate of temperature change of the first sensor and the second sensor.

In a preferred embodiment the first sensor and second sensors are a metal foil.

In a more preferred embodiment the metal foil is stainless steel that is about 0.002 inches thick.

In an alternative embodiment the first sensor and the second sensors are a hollow metal sphere.

In a preferred embodiment the first and second high emissivity coating comprises flat black paint.

In a more preferred embodiment the first and second high emissivity coating further comprises iron-manganese-oxide and copper-chromium-oxide.

In an even more preferred embodiment the first and second high emissivity coating further comprises a heat resistant paint.

In a preferred embodiment the first and second high emissivity coatings have an emissivity of at least 0.9, more preferably at least 0.95.

The first surface area is at least 110% of the second surface area, more preferably the first surface area is from 110% to 1000% of the second surface area, an even more preferably the first surface area is about 300% of the second surface area.

In a preferred embodiment the first thermocouple and the second thermocouple are a chromel-alumel thermocouple.

In a preferred embodiment the first sensor further comprises is a thin, high thermal conductivity body with a thermal conductivity of at least 5 W/m K at 600 degrees Kelvin, more preferably at least 19 W/m K at 600 degrees Kelvin, and more preferably at least 30 W/m K at 600 degrees Kelvin.

BRIEF DESCRIPTION OF THE DRAWINGS

FIG. 2. Fire classification as per Donnelly et al. 2006 and Mensch et al. 2011.

FIG. 8. Seebeck coefficients (efunda 2013)

FIG. 9. Specifications for Omega Engineering fine wire thermocouples.

FIG. 12. Commercial PASS.

FIG. 30. Rustoleum 7778 composition.

FIG. 34. Terms used in Equations 13 to Equation 17.

DETAILED DESCRIPTION OF THE INVENTION

Figure 1:
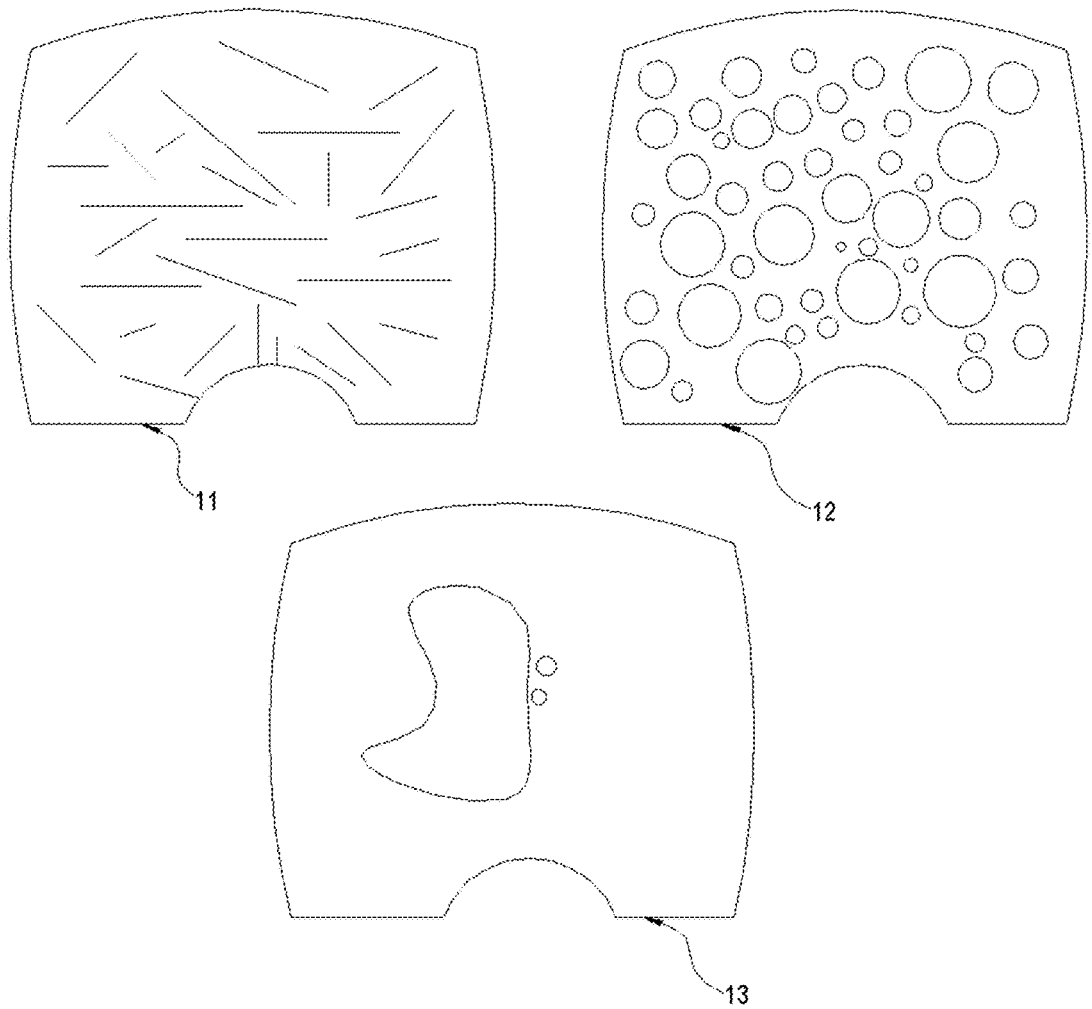
FIG. 1. SCBA face pieces exposed to various fire conditions (Mensch et al. 2011)
Figure 3:
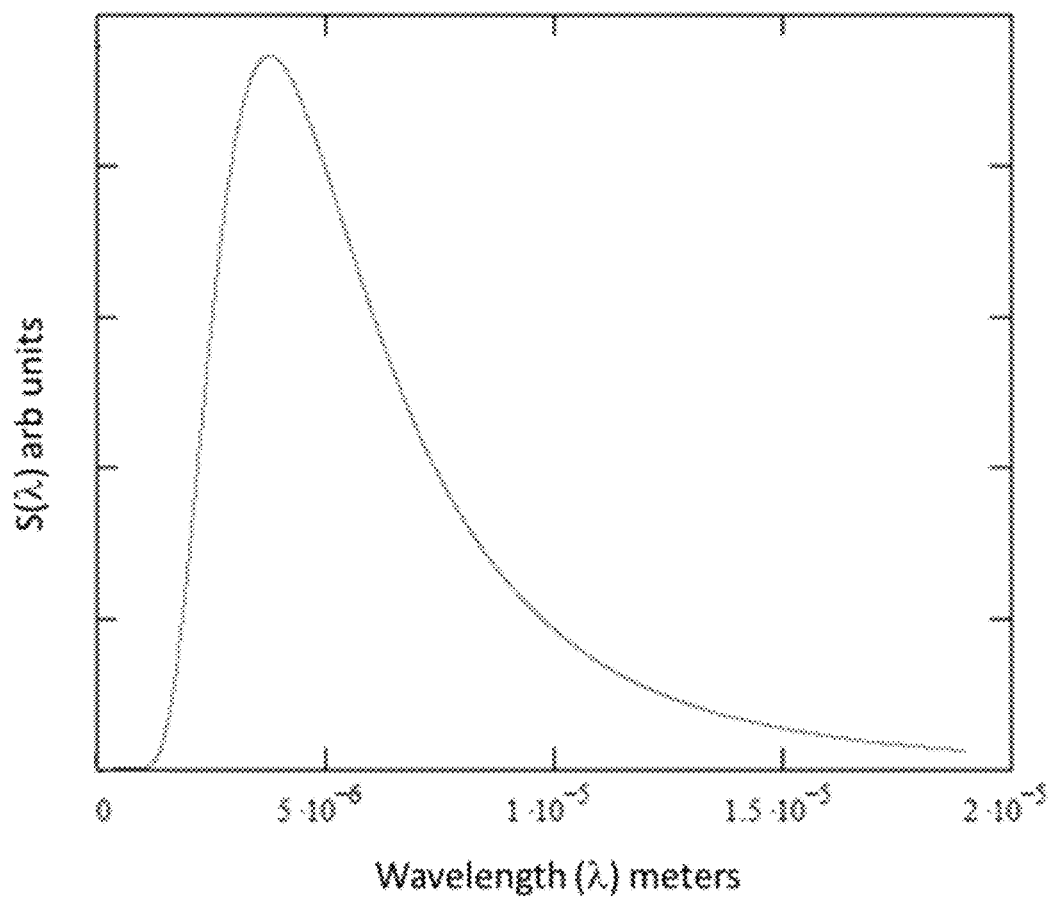
FIG. 3. Plot of Equation 3 for T=500° C.
Figure 4:
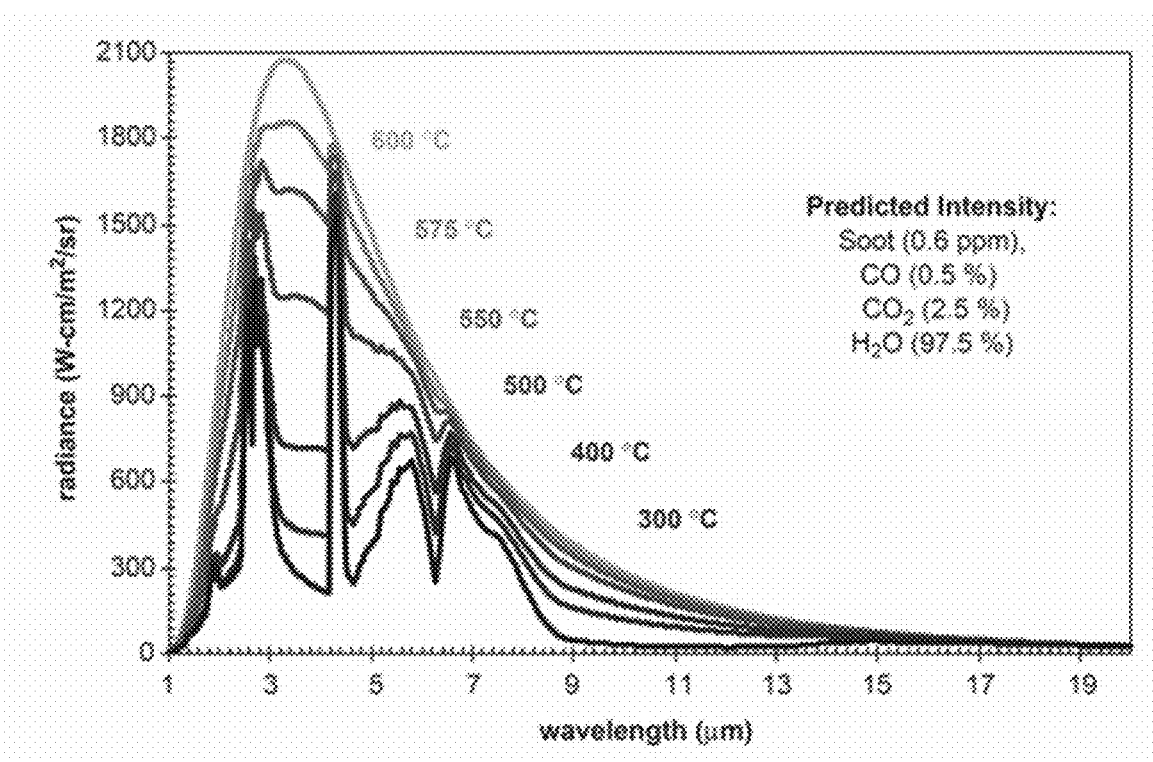
FIG. 4. Predicted radiance through (IR transparency) a simulated combustion atmosphere at 600° C. as a function of source temperature (Amon and Pearson, 2010).
Figure 5:
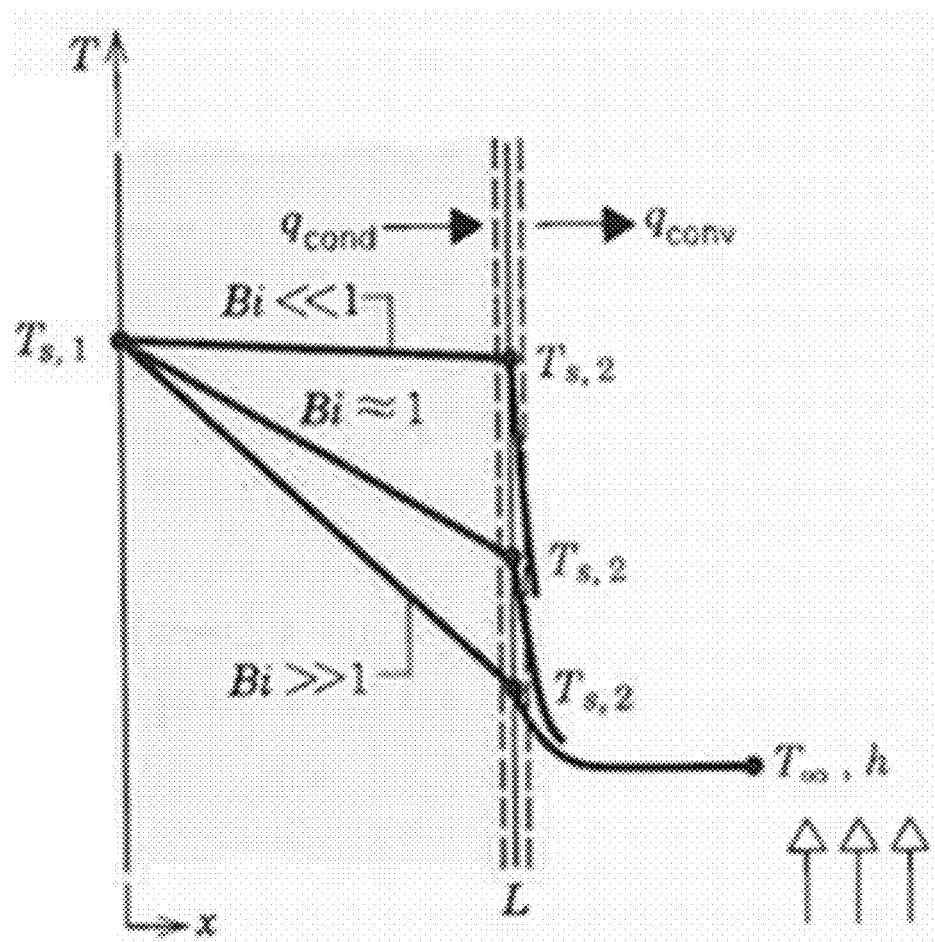
FIG. 5. Illustration of the simplification used in transient heat transfer calculations when the temperature gradient in the material is negligible (Incropera and Dewitt 1985).

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

In the claims the term thin means the dimensions of the body are such that at least either the Biot number is Bi<0.1 or the time constant is less than τ<30 seconds. Thin bodies may be flat foils, curved foils, round beads and the like. Thin bodies have a mass and a heat conduction length such that the Biot number (Equation 6) is <<1, specifically <0.1, more preferably <0.01, and even more preferably <0.001, which means that temperature gradients inside the foil or bead can be neglected. The time constant for thin bodies, when using the lumped thermal capacitance approximation (Incropera and Dewitt 1985, Introduction to Heat Transfer, Wiley) which gives a time constant (Equation 2) for calculating the bead/foil temperature vs. time Equation 3, is less than 30 seconds, preferably τ<10 seconds, and even more preferably τ<5 seconds.

The obverse side means the front side of the sensor, which is facing the direction that the heat flux is measured.

The reverse side means the opposite side as the obverse side.

Sensor mass is the mass of the high thermal conductivity material of the sensor body.

The sensor heat capacity is the measured or calculated heat capacity of the high thermal conductivity material of the sensor body.

Delta T/delta t is the same expression as $\Delta T/\Delta t$ and is the change in temperature divided by the change in time.

The Burn Saver sensor of the present invention has two sensor elements with different surface areas. Sensor elements may be made from varying geometries including non-limiting examples: thin foils disks, squares, rectangles, small solid spheres, larger hollow spheres or irregular shapes with high surface area to mass ratio. The material is a high thermal conductivity material such as a metal. In one example, a sensor has two separate thin foils (for example, but not limited to—stainless steel 0.002" thick) of different sizes (surface areas) that are facing forward (obverse) and used to measure the forward ambient temperature. Both foils are heated radiantly and convectively, but because of their different sizes, they have different convective heat transfer coefficients, which are used to calculate the ambient temperature based on the different thermal responses of the two sensors.

The first surface area is at least 110% of the second surface area, more preferably the first surface area is from 110% to 1000% of the second surface area, an even more preferably the first surface area is about 300% of the second surface area.

The sensors have a high emissivity coating on the obverse side that absorbs IR and is not detrimentally affected by soot or ash. In one non-limiting example the high emissivity coating is flat black paint, such as barbeque grill repair spray paint.

A thermocouple is connected to the reverse side of each sensor. The thin, highly conductive sensor material minimizes the transient heat effects.

A housing holds both of the sensors in close proximity. The coated, obverse sides of both sensors face the direction that is being measured and the thermocouples are attached to the reverse side.

The thermal conductivities of each sensor are known, for example by experimental determination during manufacture, construction or design. The thermocouples attached to each sensor are monitored as a function of time by an electronic content monitoring chip, or the like. Other examples include, but are not limited to, personal computers, solid state devices and programmable devices. The temperature is calculated by the electronic component(s) using equation 18, which uses the difference in the measured temperatures of the two sensor bodies. The heat flux is calculated by the measurement on a single sensor body (or on multiple sensor bodies evaluated individually) using equation 12. The safety data, such as the fire classifications in FIG. 2, are contained in data files on the electronic components. The device uses the calculated temperature and heat flux and the safety data to determine which type of hazard exists. Signals are then exported to operably connected warning devices such as lights, speakers or vibrators to warn the firefighter of the present hazards.

Figure 13:
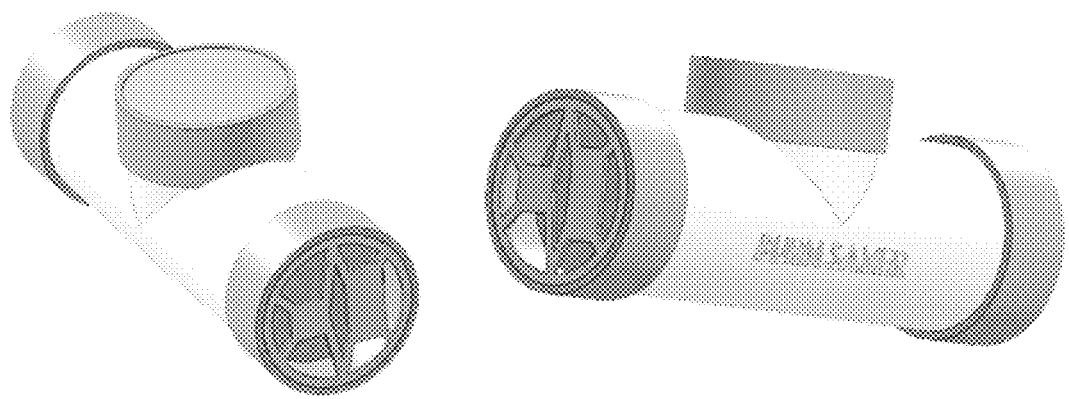
FIG. 13. Concept of Burn Saver device.

FIG. 13 shows an example of a housing structure for a Burn Saver device. The Burn Saver device may be mounted onto a firefighter helmet with strong clips and is designed to have temperature sensors facing front, optionally back, and optionally up. In the example shown, three sensors are used because infrared radiation detection is directional. The sensor housing may be made from a thermally, resistant high impact polymer. The device may detect thermal dangers in 10-20 seconds.

Figure 14:
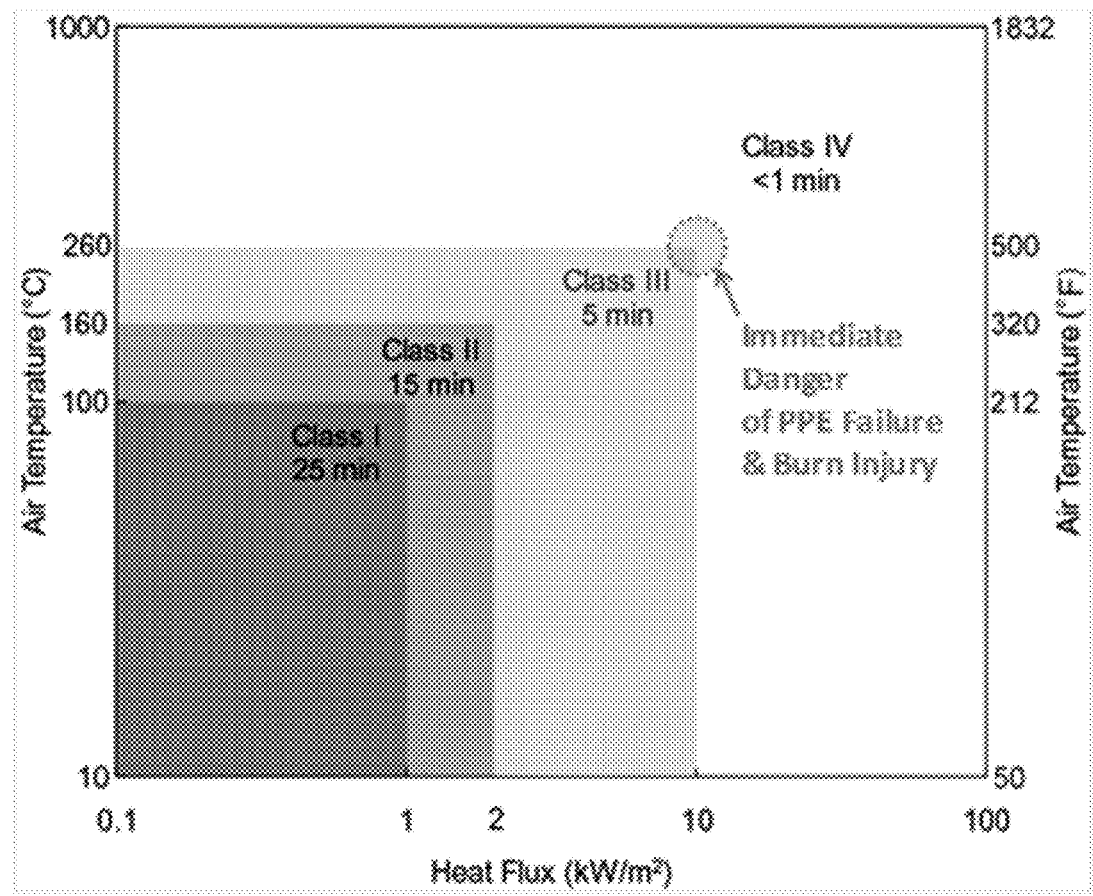
FIG. 14. Fire Heat Flux classification (Mensch et al. 2011, Donnelly et al. 2006).
Figure 15:
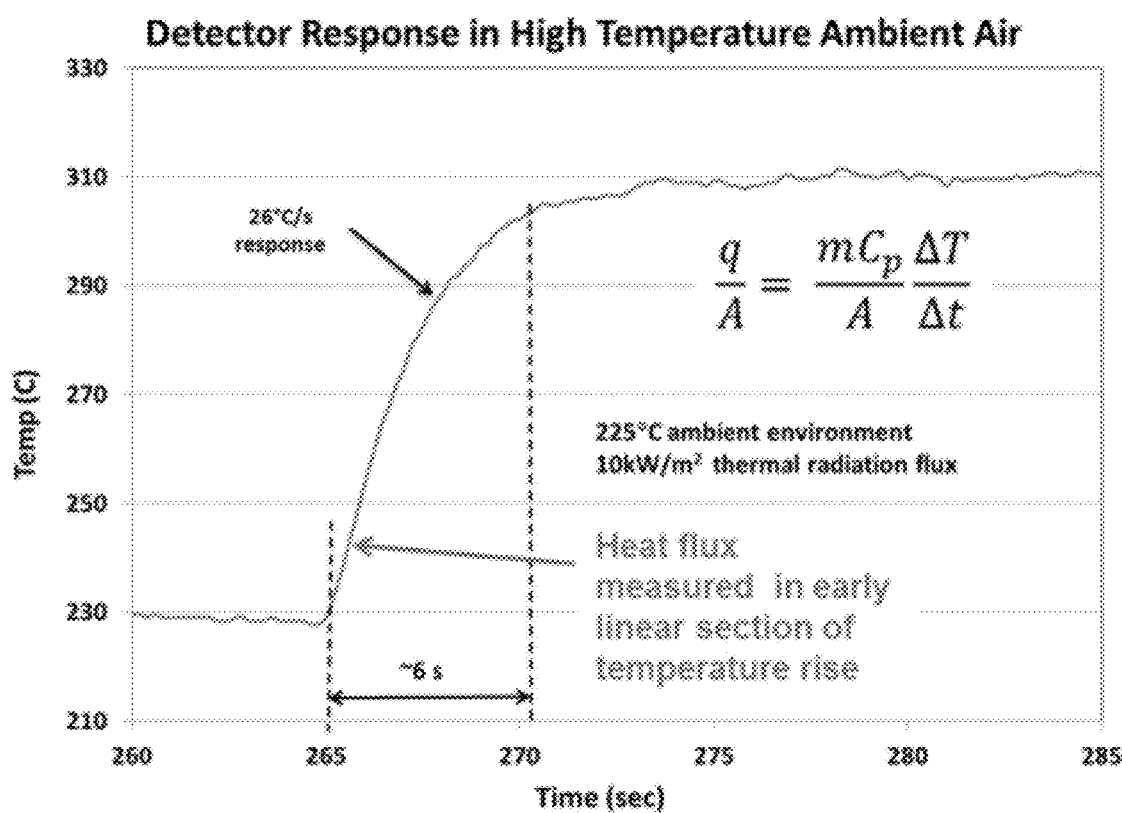
FIG. 15. Thermal response of TDA's radiant detection foil to a 10 kW/m² IR flux with the ambient air temperature at 260° C. (500° F.).

In light of the accepted classification of fires and the prescribed safety procedures in each classification (as shown in FIG. 14), there is a need to independently determine the radiant (infrared) heat flux and the environmental air temperature to accurately assess the firefighter's thermal hazard. The present invention can measure both the ambient air temperature (y-axis) and infrared (IR) radiative heat flux (x-axis). This is done by using two dissimilar sized sensor elements in at least one direction (in FIG. 13 the front facing side has the two sensors). In one example, on the top and back-facing sensors there may be only one element each. All of the elements are heated by infrared as well as convection from hot air. The ambient temperature is calculated by the difference in the thermal response of the two front facing foils, and changes in the radiant heat load (for all sensors) are measured by the rate of temperature increase as a function of time (FIG. 15).

Figure 16:
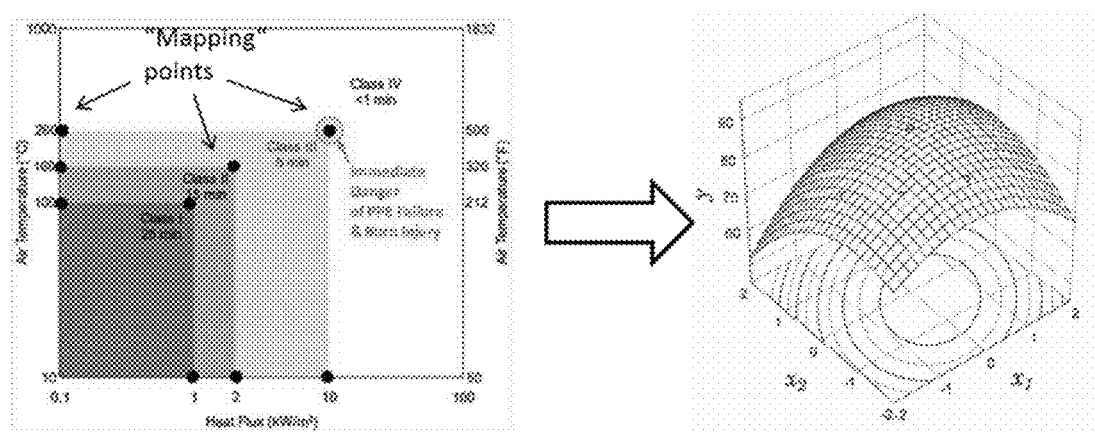
FIG. 16. An example of how a nonlinear response could result in multiple pairs of $T_{ambient}$ and IR flux producing the same temperature reading in a single temperature measurement device.

By measuring both the IR flux and ambient temperature (rather than making a single measurement) it is possible to make measurements in an environment where the air temperature is high but the radiative heat flux is low (e.g. adjacent to a fire where there are no flames, but where superheated air from elsewhere has entered the room), or conversely, to be exposed to a high heat flux in a cooler temperature environment (e.g. outside of a burning structure where the flame wall produces very high radiant energy but the outside air temperature may be not much higher than the ambient air temperature away from the fire). Therefore, the problem with simply calibrating the temperature of a single sensor device in a variety of fire environments (combinations of ambient temperature and radiant heat flux; i.e. various points as in FIG. 16) is that there will be more than one combination of ambient temperature and IR flux that gives the same single sensor temperature (i.e. the responses may be non-linear).

In one example a thin, low mass metal foils that are coated with a high temperature, flat black, baked-on paint that has an emissivity of $\epsilon=0.94$ (i.e. it absorbs 94% of incident radiation at all wavelengths). The temperature of the metal foil is measured using a fine-wire chromel-alumel thermocouple spot welded to the back. The rate of temperature increase ($\Delta T/\Delta t$) is used to calculate change in radiant heat flux (using equation 12); which gives the x-axis value in FIG. 14. To measure the ambient air temperature in the presence of free, forced or mixed convection (the y-axis value in FIG. 14) a smaller separate high IR absorptive foil is placed next to, but not touching, the foil used to measure the heat flux on the front-facing sensor (FIG. 13). The difference between these two foils is that they have different surface areas. Based on the measurement of temperature vs. time of these two independent sensors (using equation 18) both the heat flux and the ambient air temperature can be calculated.

In a preferred embodiment the first and second high emissivity coatings have an emissivity of at least 0.9, more preferably at least 0.95.

In use, if the radiation flux is $q/a \geq 10$ kW/m$^2$ or T$\geq$260° C. (transition to a Class IV fire) electronic components attached to the thermocouples are designed to trigger audible and visual alarms (or any other desired alarm type such as a vibrating buzzer) for the firefighter, and optionally simultaneously send a wireless signal to the fire commanders. An additional embodiment is that it can also be programmed to provide intermediate warnings at any desired set of conditions, for example, corresponding to transitioning between the different classes of fire shown in FIG. 14. For example, it would be useful to know when one has just entered a Class III fire environment; in this case a warning/alarm would be triggered for $q/a \geq 2$ kW/m$^2$ or T$\geq$160° C. and the alarm could be different than it would be for the Class IV situation where $q/a \geq 10$ kW/m$^2$ or T$\geq$260° C. (i.e. different sound, tone, strobe flashing sequence, etc.).

Figure 17:
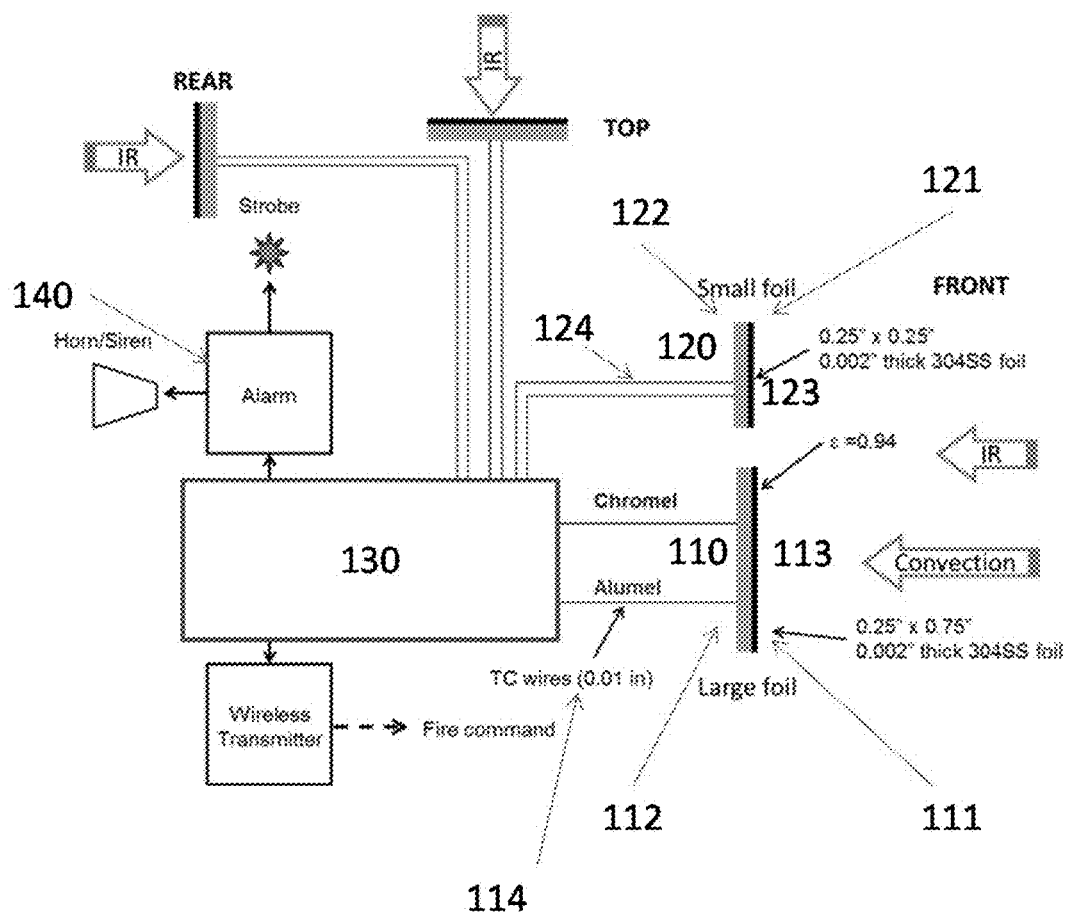
FIG. 17. Decoupling radiant and convective heat sensing device.
Figure 18:
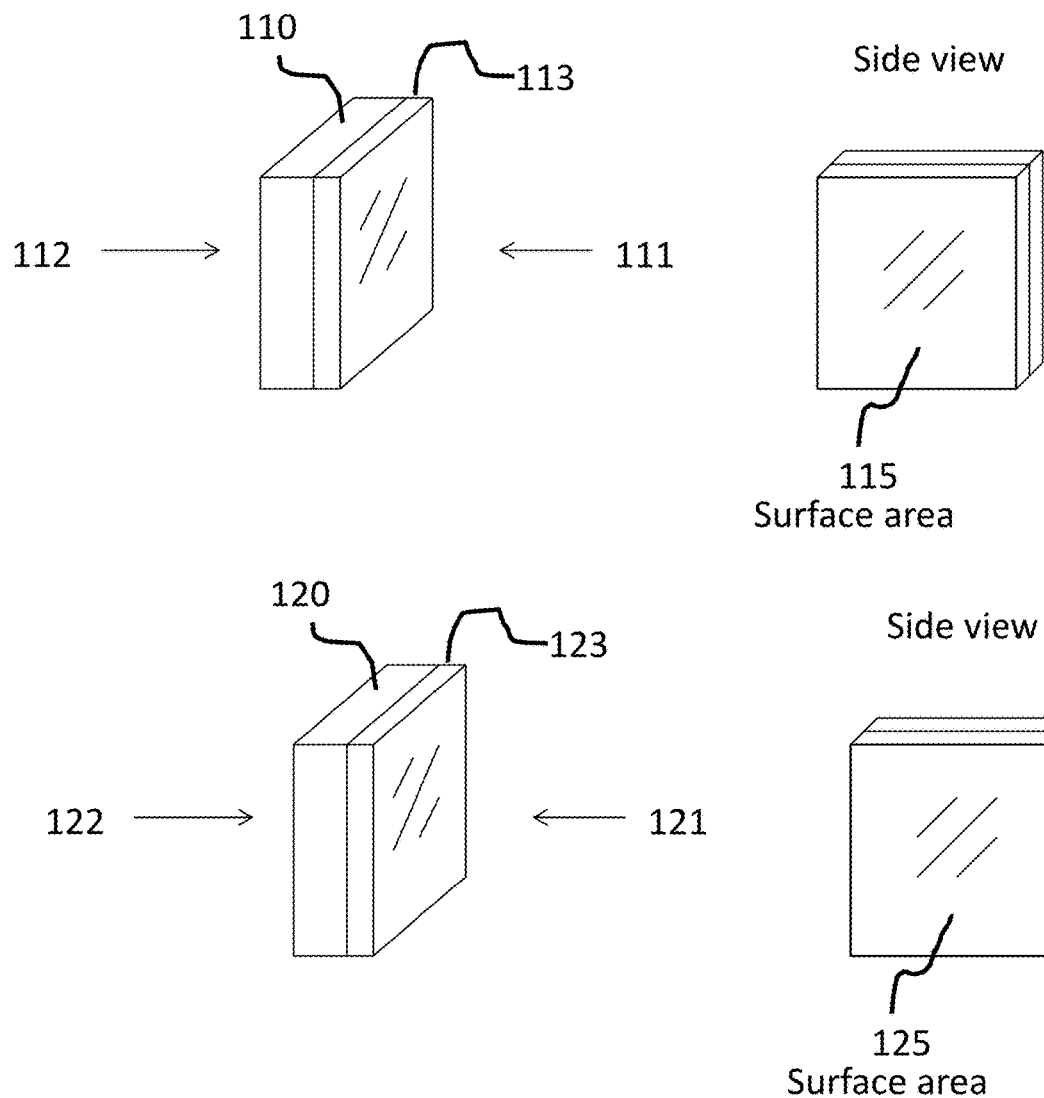
FIG. 18. First and second sensor.
Figure 19:
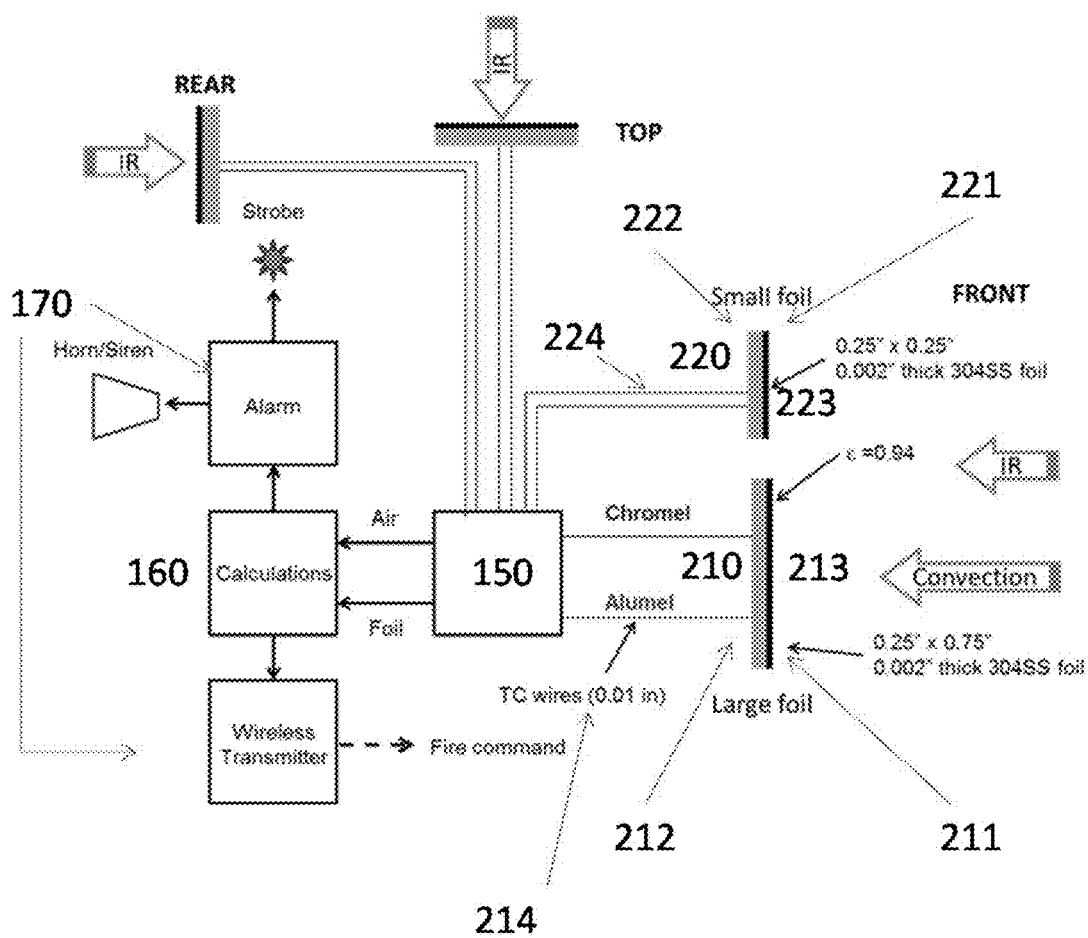
FIG. 19. Decoupling radiant and convective heat sensing device with additional embodiments.
Figure 20:
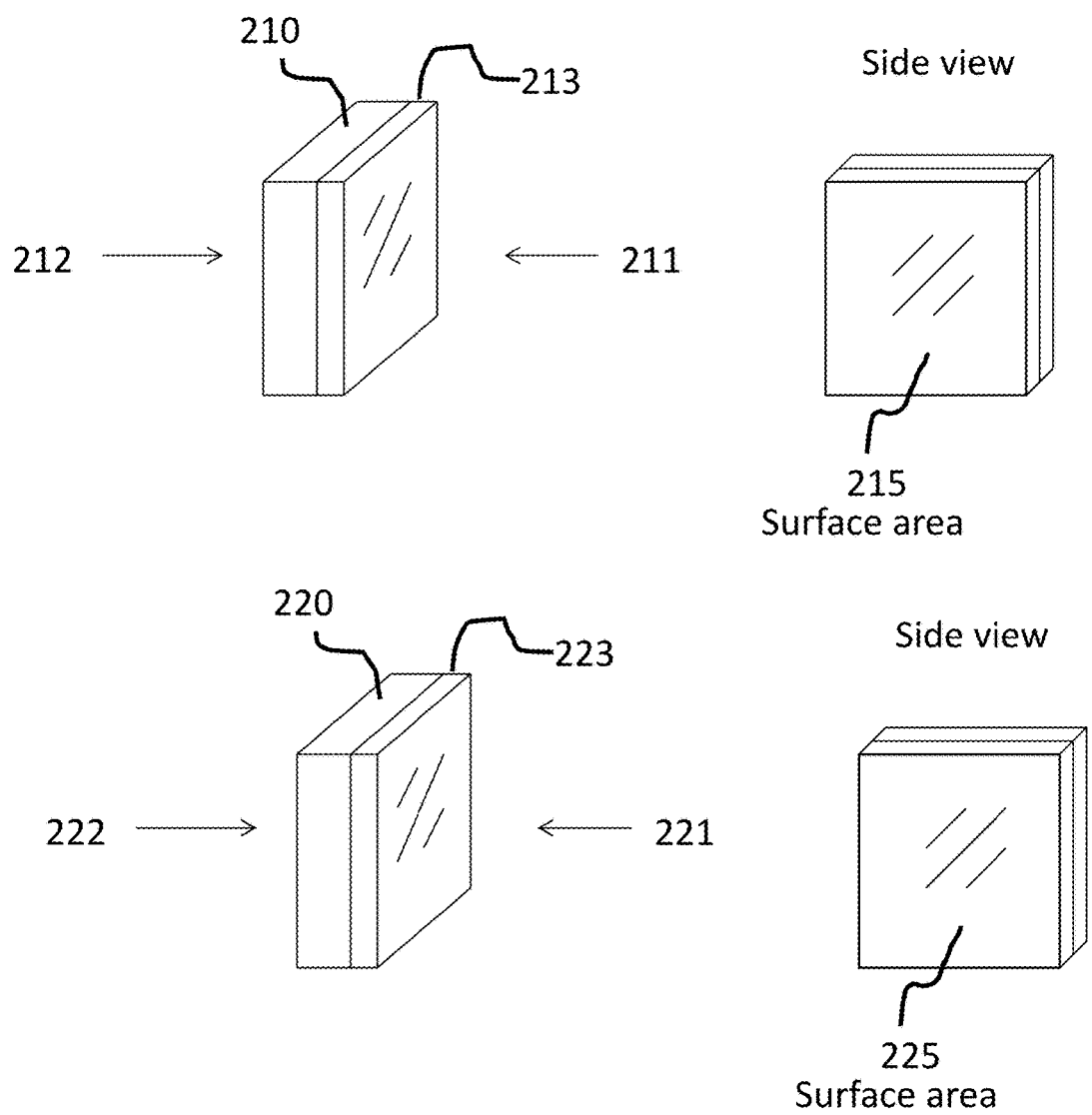
FIG. 20. First and second sensor for device with additional embodiments.

The diagram in FIG. 17 is an example of a Burn Saver device. Infrared radiation is absorbed by high emissivity coated, thin stainless steel foils. Thermocouples measure the temperature of the sensor bodies. The thermocouples are operably connected to a voltage input card and a personal computer which measures the voltage, determines the temperature vs. time, and also performs the calculations described in this application (Equation 12 and equation 18). It should be understood to a Person Having Ordinary Skill in The Art that the personal computer can be replaced by a small electronic device and a portable power source such as a battery. Both foils are heated by IR and convection; however, the device calculates the values of the radiant heat flux and ambient temperature from the thermal responses of the two dissimilar sized sensors. The foil temperatures are measured using fine wire thermocouples and the TC outlet voltages (millivolts) can be processed by a programmable chip. The chip (or personal computer as in the illustrated example) is programmed to calculate the rate of temperature rise ($\Delta T/\Delta t$), which is then used to calculate the heat flux in kW/m$^2$ using the known mass and heat capacity of the foil, or foils if multiple heat flux measurements are taken. A second sensor foil in the front (that has a smaller surface area) is placed next to the IR flux measurement foil. Its TC voltage is also converted into a temperature signal. The programmable chip then calculates the ambient temperature based on the different thermal responses of the two front facing foils (equation 18). If the radiant flux is greater than 2 kW/m$^2$, or the air temperature is higher than 160° C., then a warning is sounded that the firefighter has transitioned from a Class II to a Class III fire. The means of altering is either a visual warning for example a light and/or an auditory signal from a speaker or a tactile warning from a vibrator, for example. Each of these means of alerting is operably connected to the electronic chip or computer. The device also comprises a power source, for example a battery, to power the electronic chip. If the flux is 10 kW/m$^2$ or higher, or the temperature is 260° C. or higher an emergency alarm is sounded because one has transitioned into a Class IV fire, which requires immediate egress. Using two front foils simultaneously measuring radiant heat flux and ambient temperature it is possible to measure the temperature ±10° C., while responding to a change in radiant heat flux in less than 10 seconds. The Burn Saver device responds to both convection (free and forced) and radiation (discussed next) and the ambient temperature is calculated based on the difference in the thermal response of two different sized metal foil sensor elements.

Emissivity is an important property for the Burn Saver device. The coating can be acetylene black, which has an emissivity of $\epsilon=0.97$. More preferably, the high emissivity coating is a baked-on flat black, high temperature paint that has a measured emissivity of $\epsilon=0.94$ (i.e. 94% of all the EM is absorbed). By using a high emissivity absorber in our Burn Saver, absorb energy at all wavelengths and use the amount of energy absorbed as a function of time to calculate radiant heat flux.

Using a high emissivity coating on a thin metal foil ensures that the Burn Saver can detect IR at all wavelengths. The absorption of the IR energy raises the temperature of the foil, which is measured with a thermocouple, and the rate of temperature increase ($\Delta T/\Delta t$) is used to calculate the incident IR heat flux in kW/m². Conduction is the third mechanism for heat transfer and it is important in the Burn Saver because the temperature of the foil must be measured rapidly and accurately (conduction is also an important consideration when minimizing heat losses down the thermocouple wires or to any insulation touching the foils).

For materials that are thin in the direction of heat conduction (such as metal foils), simplifying assumptions can be made if the temperature gradient through the foil is negligible that reduce the transient heat conduction problem to algebra.

In an example, the radiation sensing element is a thin (0.002 inch) stainless steel foil that has been coated with a high temperature flat black paint ($\epsilon=0.94$). To obtain maximum sensitivity to absorbed infrared (IR) radiation, the foil must have low mass (to minimize its total heat capacity) and high surface area (to maximize the amount of intercepted IR radiation). When suddenly exposed to a high IR heat flux, the temperature of the foil increases rapidly.

For example, with a source temperature of 800K the Biot number for a 2.0 mil thick foil is Bi≅0.001 which is <<1, meaning that the lumped capacitance assumptions are valid.

Figure 6:
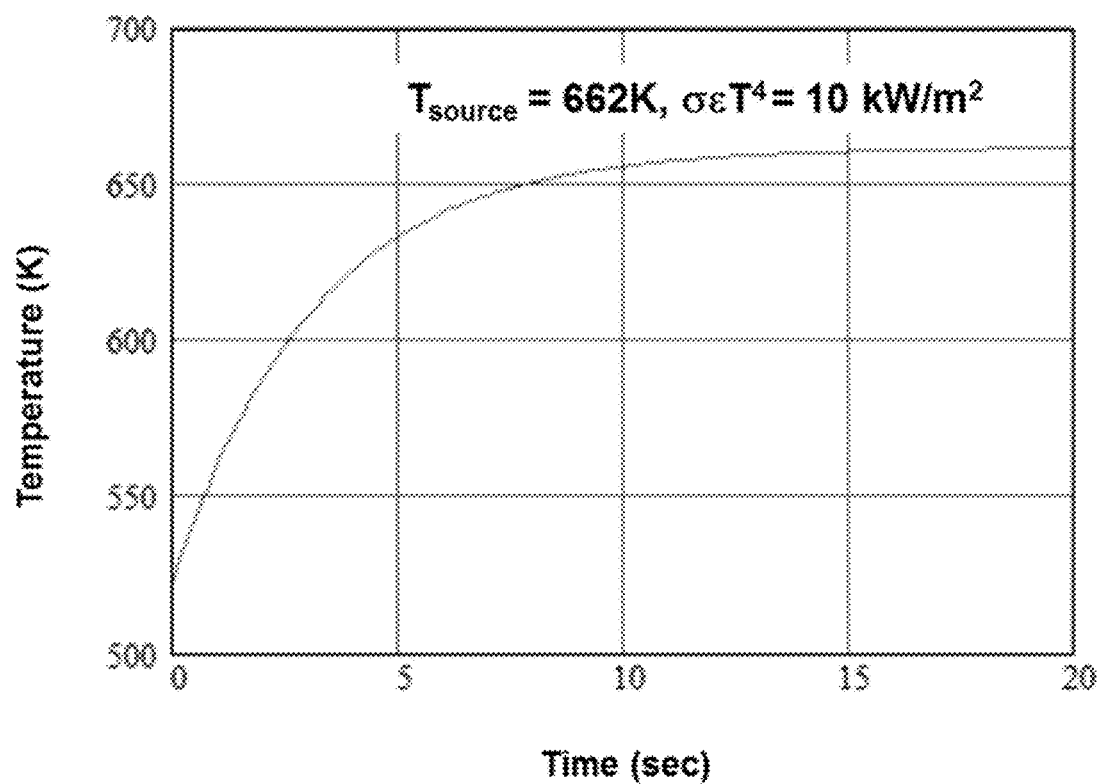
FIG. 6. Transient thermal response of a 2 mil stainless steel foil (Equation 8) to a 10 kW/m² radiant heat flux.
Figure 7:
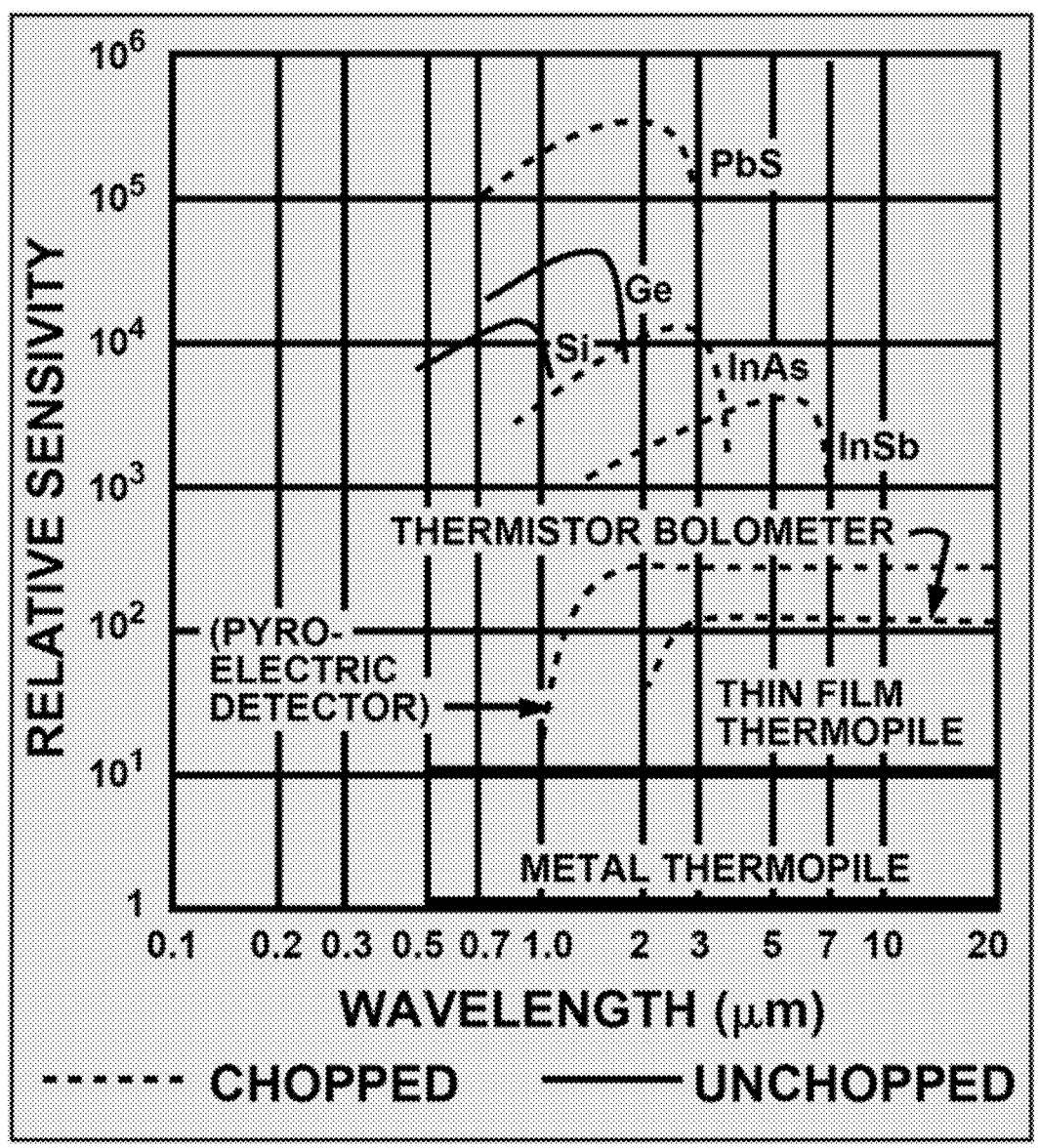
FIG. 7. Sensitivity of various IR detectors (Barron, 1999).
Figure 10:
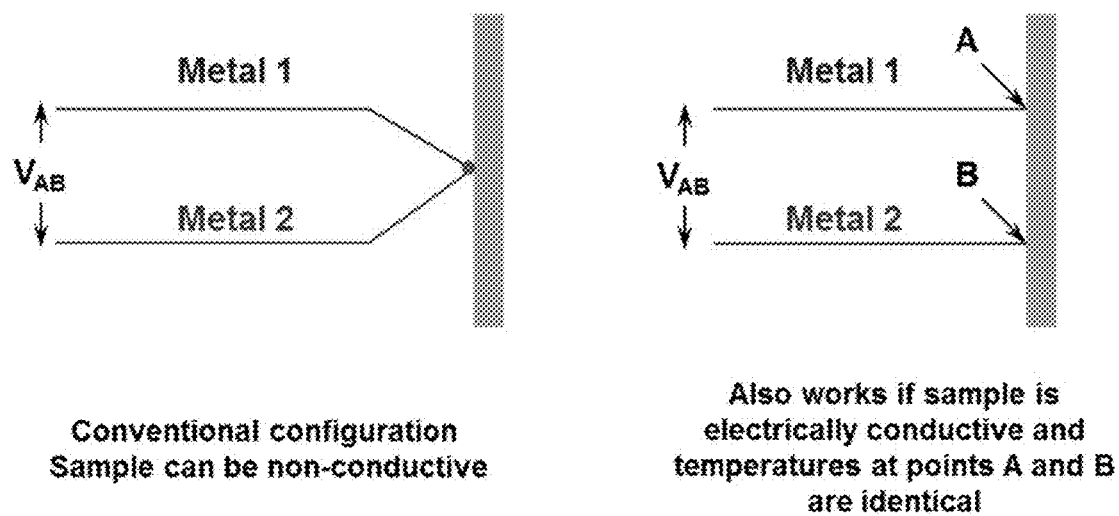
FIG. 10. Thermocouple with two methods of attachment
Figure 11:
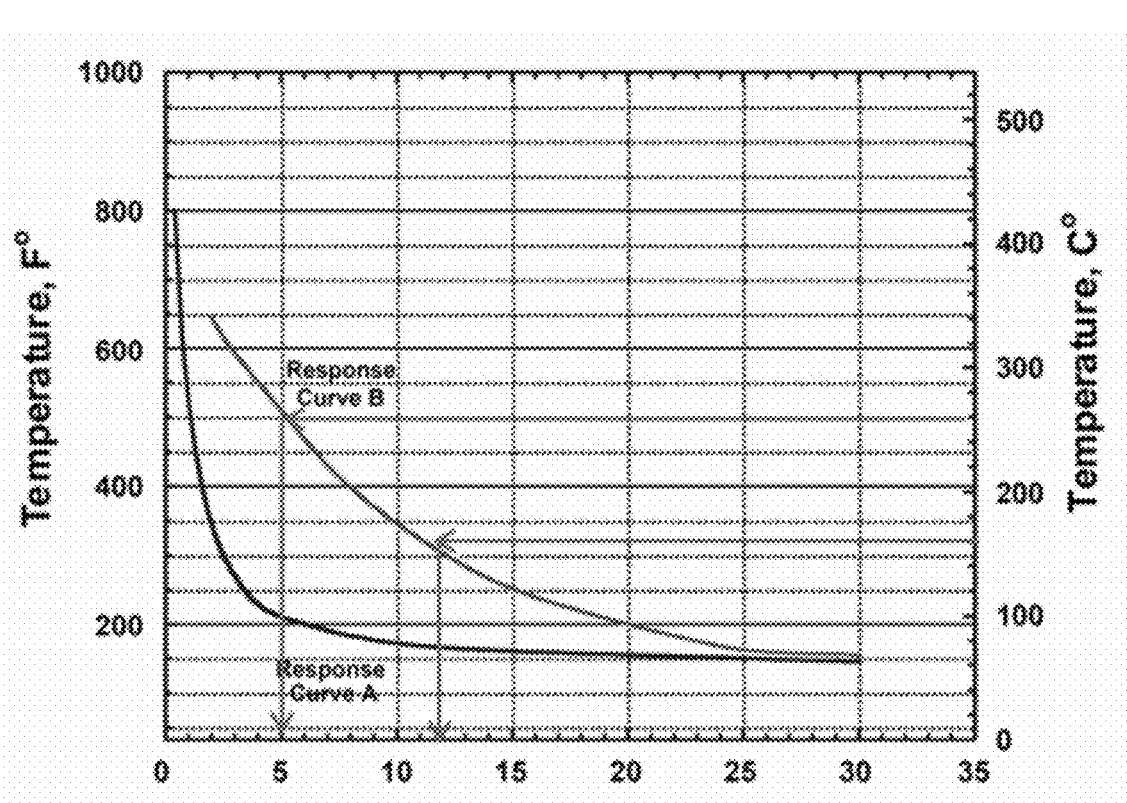
FIG. 11. Temperature response curves for PASS devices as measured by Bryner et al. 2005.

For a 0.75 inch diameter stainless steel foil 0.002 inch thick (k=22 W/mK, $C_p$=477 J/kgK, $\rho$=7900 kg/m³), the time constant is about 1.7 sec. The thermal response time decreases as the temperature of the IR source increases because this increases $h_{rad}=4\sigma\epsilon T_h^3$ in the denominator of Equation 7. This effect allows one to calculate the radiant heat flux from the rate of temperature rise of the foil. The temperature vs. time behavior is then given by Equation 8, an example of which is plotted in FIG. 6, where Ti is the initial ambient air temperature (in this example 250° C.) and $T_\infty$ is the radiant source temperature (400° C.).

Thermocouples can be used to measure both the temperature of the ambient air (y-axis in FIG. 2) and thermal radiation heat flux (x-axis in FIG. 2) because they are inexpensive, mechanically robust, can withstand very high temperatures, and do not require complex electronics for operation. Also, a thermocouple can easily be spot welded to the back of the foil.

Figure 21:
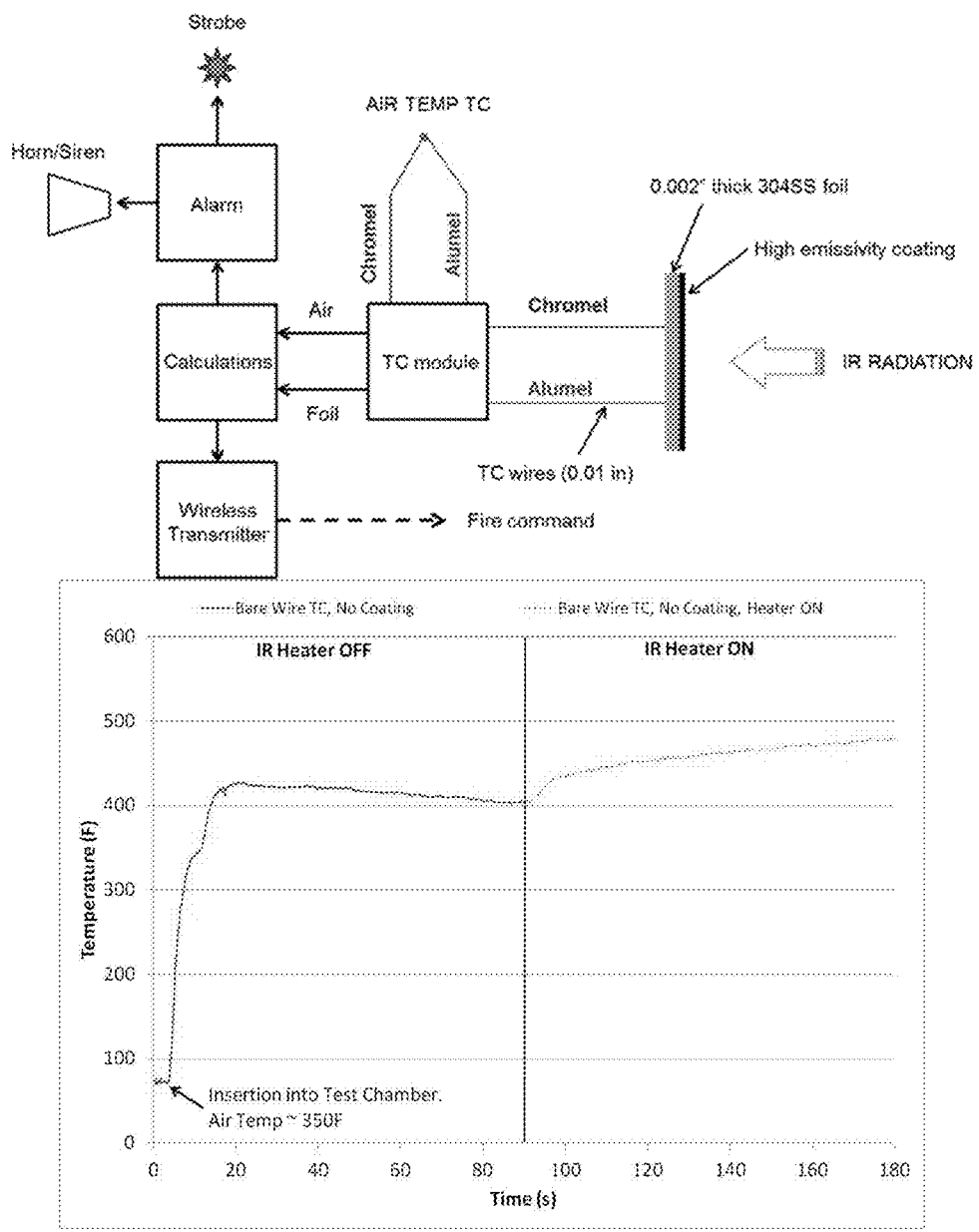
FIG. 21. Measuring IR with an absorbing foil and air temperature with an ordinary thermocouple.
Figure 22:
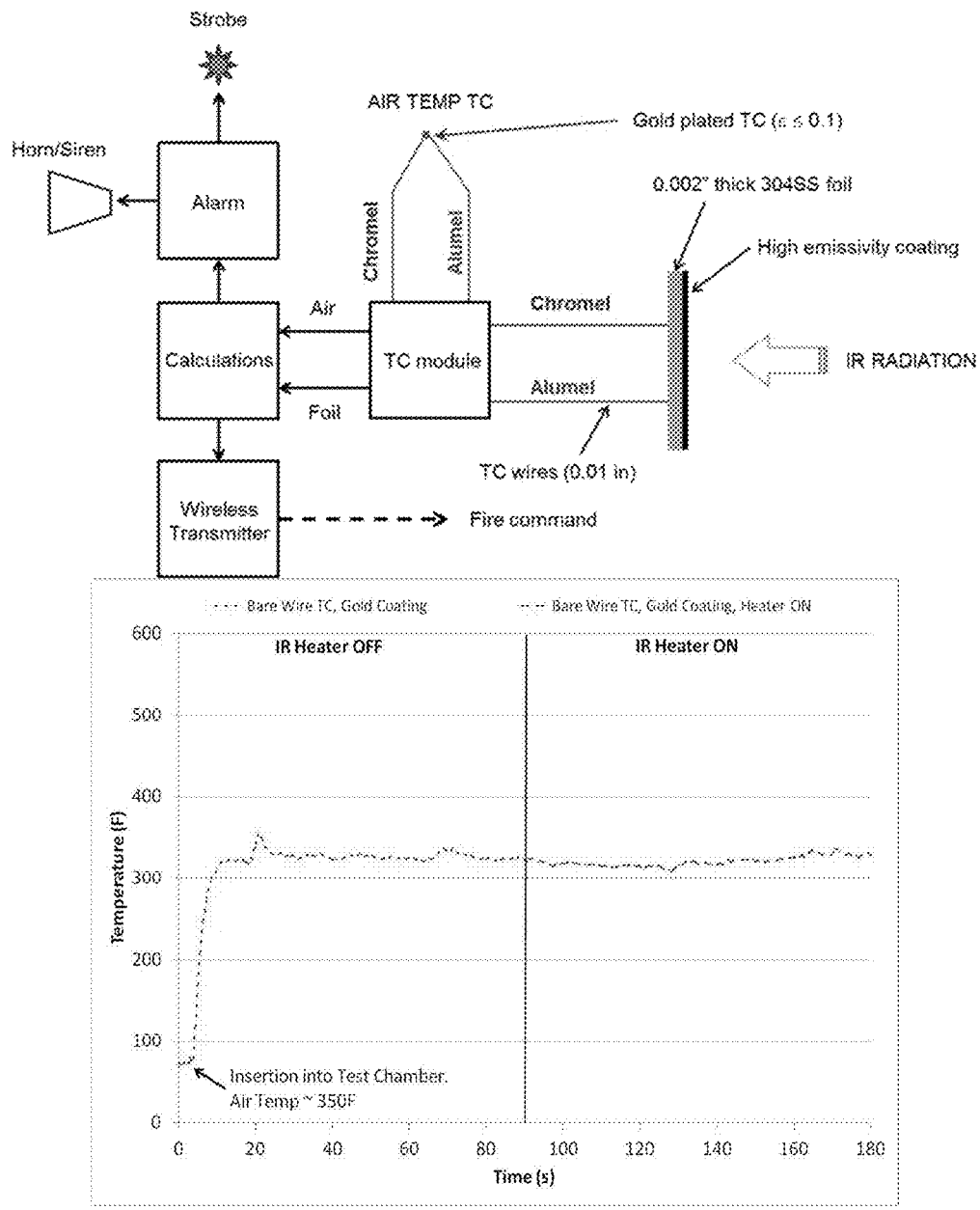
FIG. 22. Measuring IR flux with an absorbing foil and ambient air temperature with a gold plated (low emissivity) thermocouple.
Figure 23:
FIG. 23. Fire environment makes using low emissivity thermocouple coatings impossible.
Figure 24:
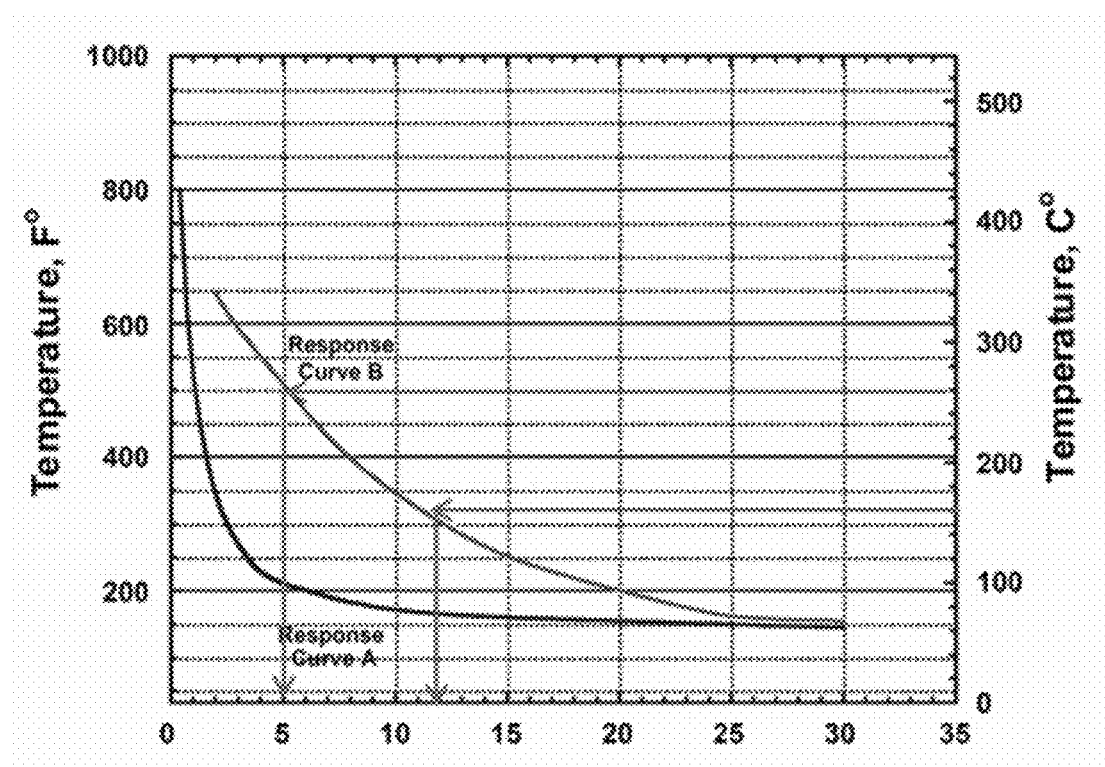
FIG. 24. Temperature response curves for PASS devices as measured by Bryner et al. 2005

In a comparative example of a related device that can only operate in clean environments, a high emissivity coated material (such as a foil disk) is used to absorb IR (it will also be heated convectively) and a second temperature sensing element that has very low emissivity so that it is not very efficiently heated by IR is used to measure temperature. For example, see FIG. 21 and FIG. 22. FIG. 21 shows the results using a plain thermocouple sticking out in the air to measure the ambient temperature. As shown on the graph at the left, when the heater is turned on, radiant heating is significant with the bare thermocouple (that has a 304SS sheath). FIG. 22 shows the same experiment were we first plated the thermocouple with gold by physical vapor deposition (in the apparatus we use to Au coat specimens for scanning electron microscopy). Clean, polished Au has a emissivity of about $0.01<\epsilon<0.02$ meaning that 98-99% of the IR is reflected from the Au coated surface. Note that in FIG. 22, when the IR heater is turned on, the air temperature TC does not respond indicating that convection is the main mechanism for heat transfer to the Au plated TC. While this is an excellent solution to the problem for clean environments, firefighting environments are very dirty (FIG. 23) and any Au plated surface would be quickly contaminated. This in turn would increase its emissivity and its ability to absorb IR. For example, simply putting a fingerprint on the Au coated TC bead increases the emissivity from about $\epsilon=0.02$ to 0.2 meaning that the TC now absorbs 10× as much IR compared to the clean polished Au surface. As a result, Burn Saver of the present invention measures the IR flux and ambient air temperature in an environment where the sensors may be exposed to soot, ash, smoke, steam, liquid water and other contaminants.

In a preferred embodiment the first sensor further comprises is a thin, high thermal conductivity body with a thermal conductivity of at least 5 W/m K at 600 degrees Kelvin, more preferably at least 19 W/m K at 600 degrees Kelvin, and more preferably at least 30 W/m K at 600 degrees Kelvin.

Example 1: Heat Testing Apparatus

Figure 25:
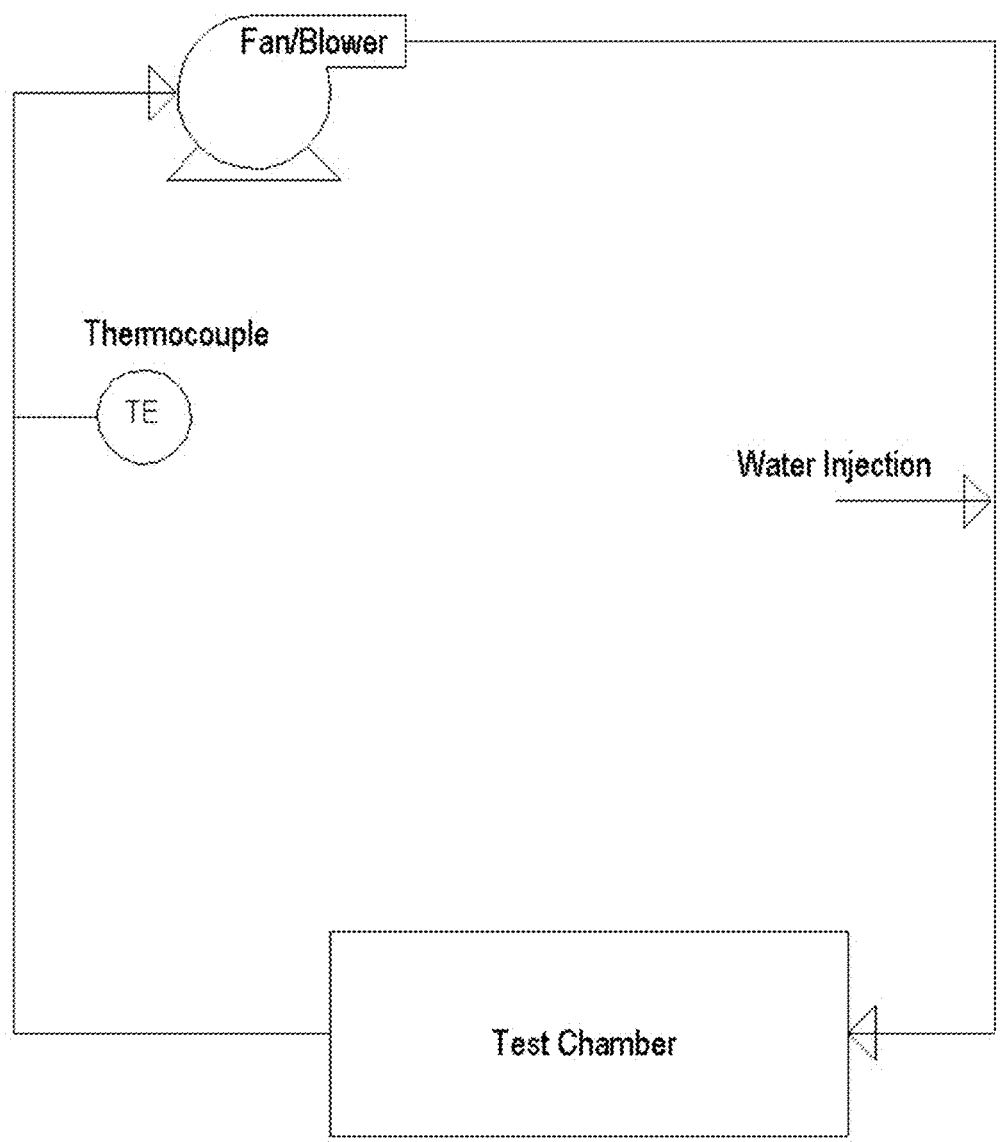
FIG. 25. Burn saver device test apparatus.

An apparatus for testing the Burn Saver device was constructed and calibrated to operate in free and forced convection, and in radiation heat transfer modes (FIG. 25). The heat transfer modes match key set points derived from research efforts by Mensch et al. 2011 and Donnelly et al. 2006 that describe the heat fluxes and air temperatures used to classify fires into four hazard types (FIG. 14).

The apparatus acts like a convection oven that has been designed so that both convective and radiative heat loads can be varied simultaneously and independently. Calibration of the unit was done to characterize the output of the radiant heater at stepped power input levels.

Figure 26:
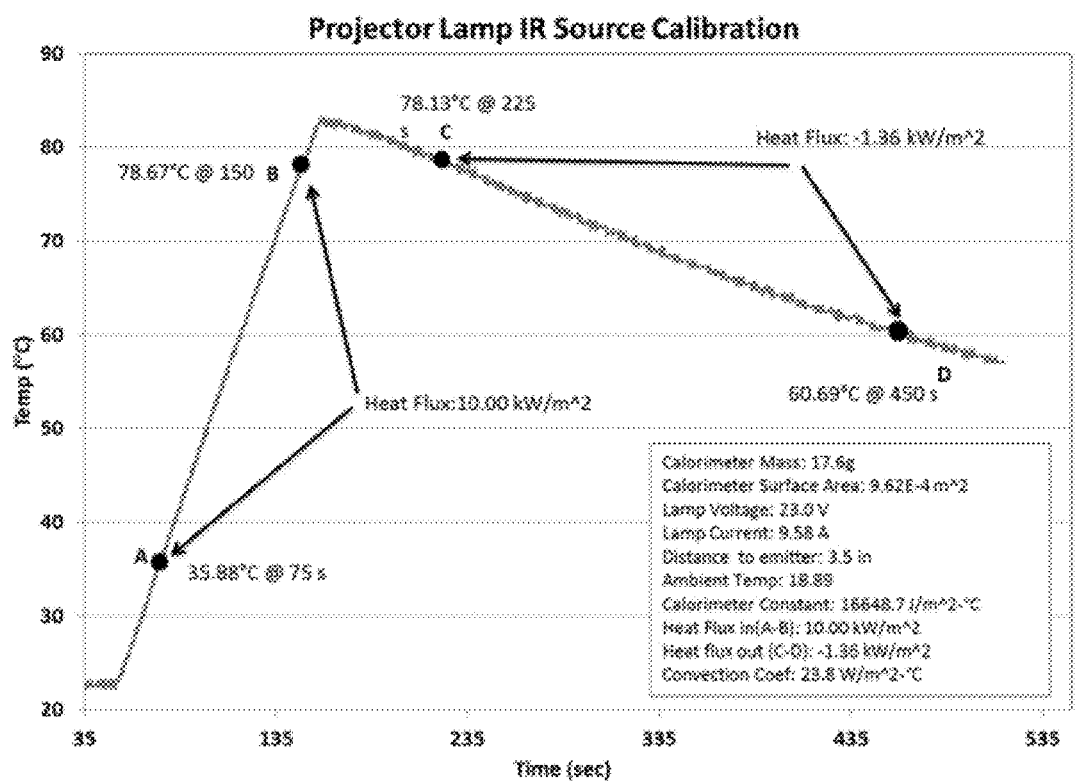
FIG. 26. Calibration data for IR source.

The radiant power level was obtained by using the IR source to heat a round aluminum billet that had been coated with acetylene black ($\epsilon=0.97$). The calorimeter was in direct line of sight with the IR source. The heat flux can be determined by measuring the temperature rise of the metal billet as a function of time. It is thick enough to have a reasonably large mass, but thin enough so that Bi<<1, thus avoiding internal temperature gradients (which allows transient heating to be analyzed in terms of a lumped thermal capacitance as discussed earlier). Blackened aluminum was used because aluminum has a very high thermal conductivity, which decreases the Biot number. Knowing the mass of the billet, its heat capacity, the cross sectional area of the blackened surface facing the IR source, and the temperature rise ($\Delta T/\Delta t$), the IR flux can be calculated. Equation 11 is used to calculate the radiant heat flux (for simplicity, shown here without the corrections we make for conductive losses to the thermocouple wires, the insulation in which the billet is mounted, as well as free convection losses at the front face of the billet). In calibrating the IR source all of the heat losses are taken into account. FIG. 26 shows some of the calibration data.

Equation 11. Calculation of heat flux using calorimetry:

$$\text{Flux} = \left[\frac{\text{kW}}{\text{m}^2}\right] = \frac{Q}{A} = \frac{m_{billet} C p_{Al} \frac{\Delta T}{\Delta t}}{A_{billet\,face}}$$

Figure 27:
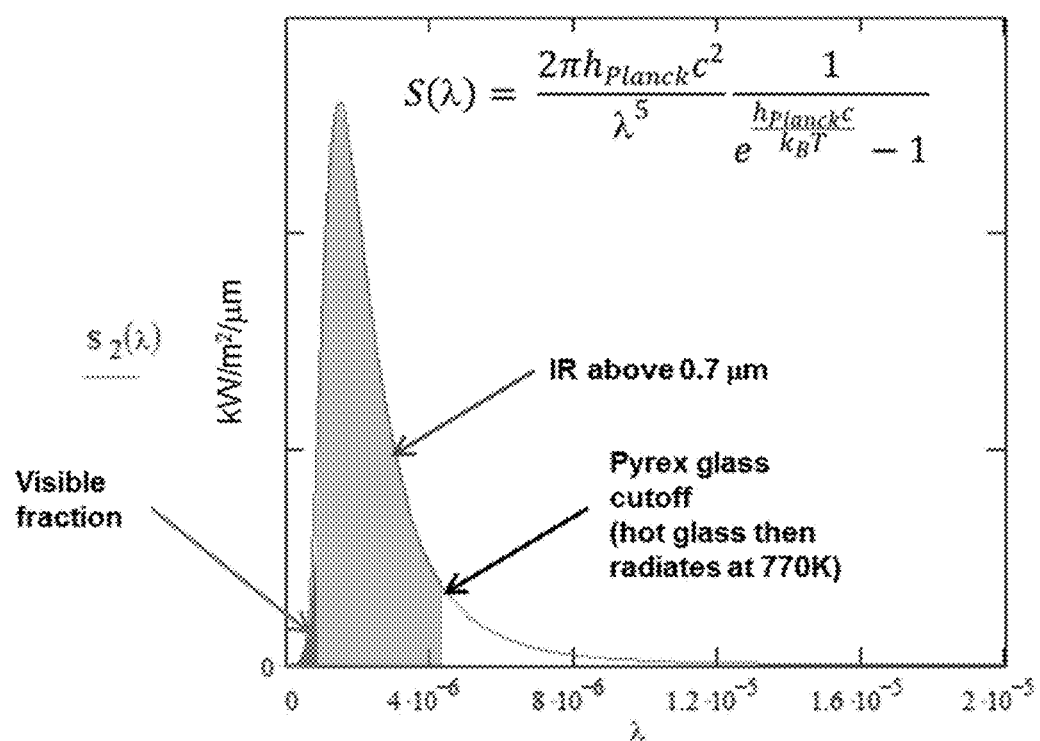
FIG. 27. Plot of radiative intensity versus wavelength (Equation 3) showing fraction of visible light, IR cutoff and re-radiation by hot glass lens.
Figure 28:
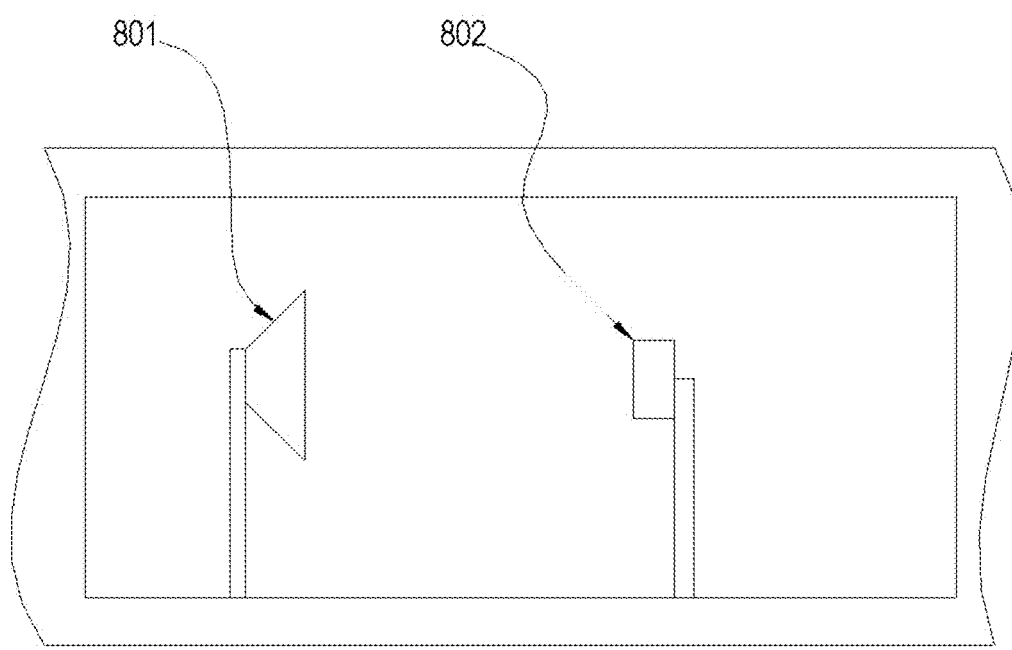
FIG. 28. Oven interior with IR lamp (left) and test specimen (right).

The infrared source was a projector bulb with varied amount of applied power. Despite the fact that the bulb emits considerable visible light (its main function), if one calculates the intensity of radiation as a function of wavelength for a 2000K filament using Equation 3, one finds that only about 10% of the electromagnetic radiation is in the visible part of the spectrum; and that 90+% of energy is emitted in the infrared (FIG. 27). The visible spectrum spans from about $0.39 \times 10^{-6}$ m<visible light<$0.7 \times 10^{-6}$ m (400-700 nanometers). Power to lamp and distance to test article are adjusted to give 10 kW/m2 thermal radiation. FIG. 28 shows the lamp in front of a test article.

Figure 29:
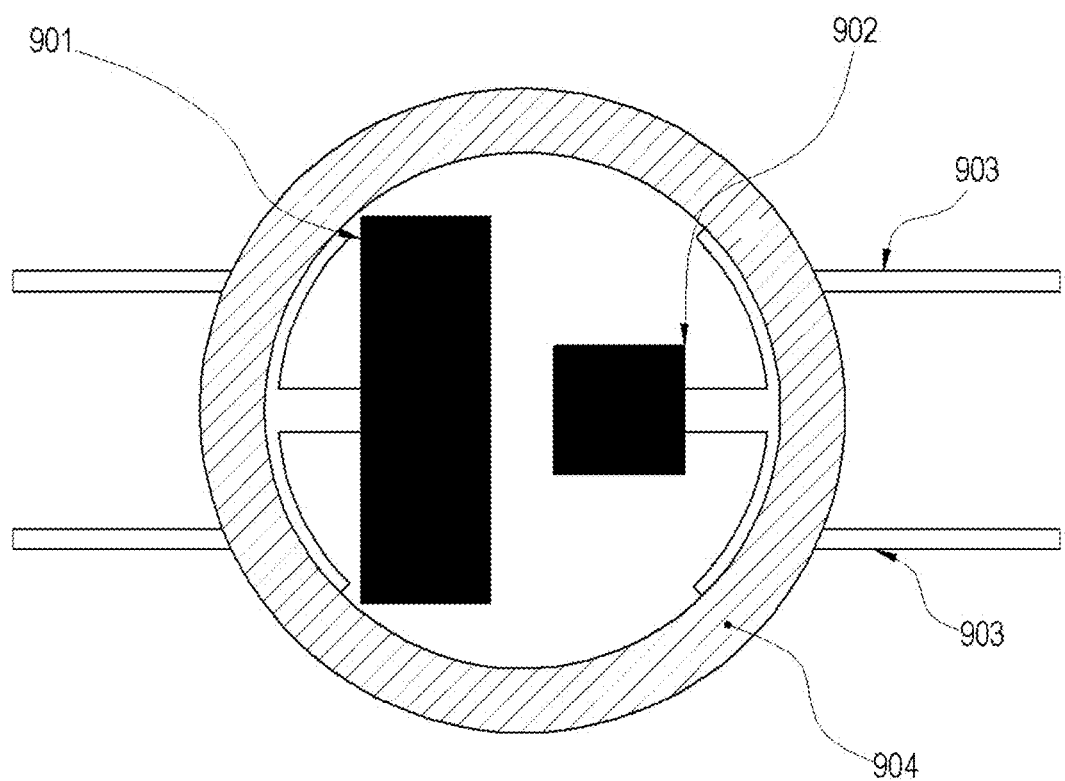
FIG. 29. Photograph of front foil test setup (heated air flow perpendicular to foils—into the page; IR lamp faces the foils).

Example 2: An Example of a Burn Saver Device with One Square and One Rectangular Sensing Element In this example two front facing foils of different size are used to simultaneously measure radiant heat flux and ambient temperature (FIG. 29). Both foils are heated radiantly and convectively, but they have different convective heat transfer coefficients because of their different sizes, which permits calculating the ambient temperature. This example also uses an optional flow straightening device attached to the front of the Burn Saver that increases the convective heat transfer coefficients substantially by increasing the amount of flow that directly impinges onto the foils. This modification does not block any IR and protrudes 0.25".

The IR sensor foils were coated with a high temperature, high emissivity, flat-black spray paint (Rustoleum 7778, high-heat, barbeque black, FIG. 30). In this and most high temperature spray paints the black pigments are iron-manganese $[(Fe,Mn)_3O_4]$ and copper chromium oxide spinels $(CuCr_2O_4)$. The term spinel refers to the crystal structure, which is based on the structure of the mineral spinel $(MgAl_2O_4)$. The pure iron end member of $(Fe,Mn)_3O_4$ is the familiar mineral magnetite $(Fe_3O_4)$. Other ingredients include mineral spirits and ethyl benzene (solvent carriers that evaporate), and magnesium silicate (which based on the CAS number is talc $(Mg_3Si_4O_{10}(OH)_2)$. The paint is cured at high temperature where presumably the talc dehydroxylates and eventually converts into $MgSiO_3$ (Galwey and Brown 1999), and in the process, cements the Fe—Mn and Cu—Cr oxide particles to the surface. It is the Fe—Mn and Cu—Cr spinels that impart high emissivity to the paint.

Figure 31:
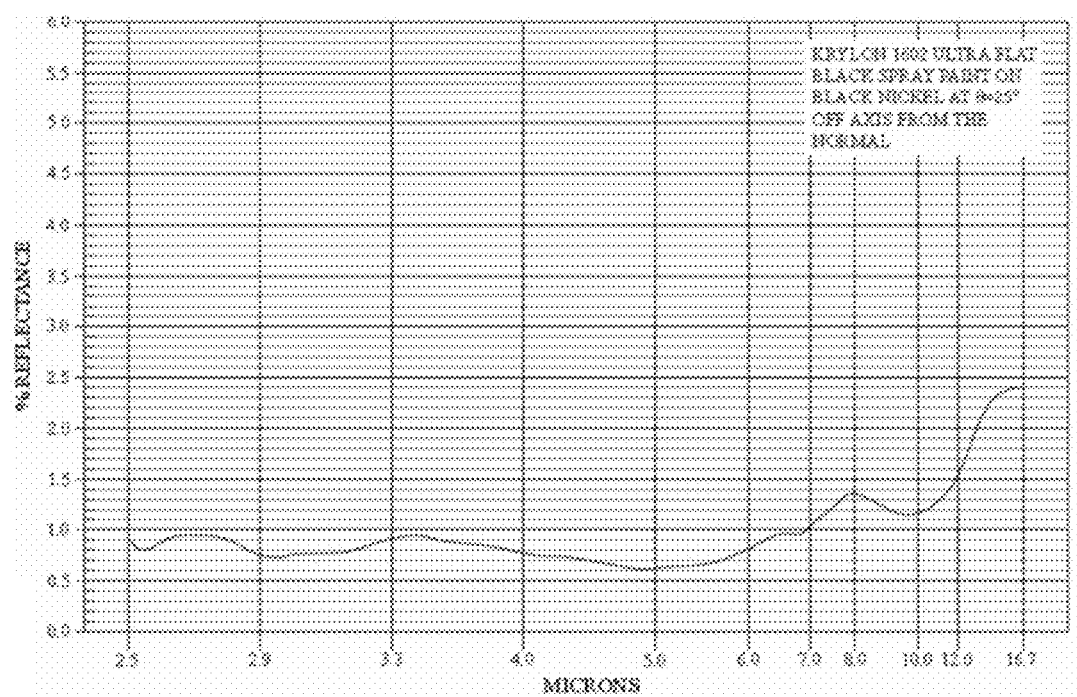
FIG. 31. IR reflectance spectrum for Krylon 1602 Ultra Flat Black spray paint applied to black nickel, 25° off the normal (Hess 2001).

FIG. 31 is a reflectance spectrum of anther optional flat black high temperature paint (Krylon 1602) between 2.5 and 16.7 μm. Up to 12 μm the reflectivity is never more than 1.5% (0.015) meaning that in this region the absorptivity a and therefore the emissivity $\epsilon = 0.985$. Krylon 1602 uses the black oxide spinel pigments as does Rustoleum 7778. We have measured the emissivity of the Rustoleum 7778 in the laboratory to be $\epsilon = 0.94$ based on calibrating our calorimeter when coated with acetylene black (that has a known $\epsilon = 0.98$). The Rustoleum 7778 is a durable heat-cured coating that can withstand the adverse conditions expected when using the Burn Saver in a firefighting environment.

Example 3: Testing a Burn Saver Device: Two Sizes of Detector Foils are Used in the Front Sensor The temperature vs. time data from the two foils is used to calculate the heat flux (equation 12) and ambient temperature (equation 18).

Figure 32:
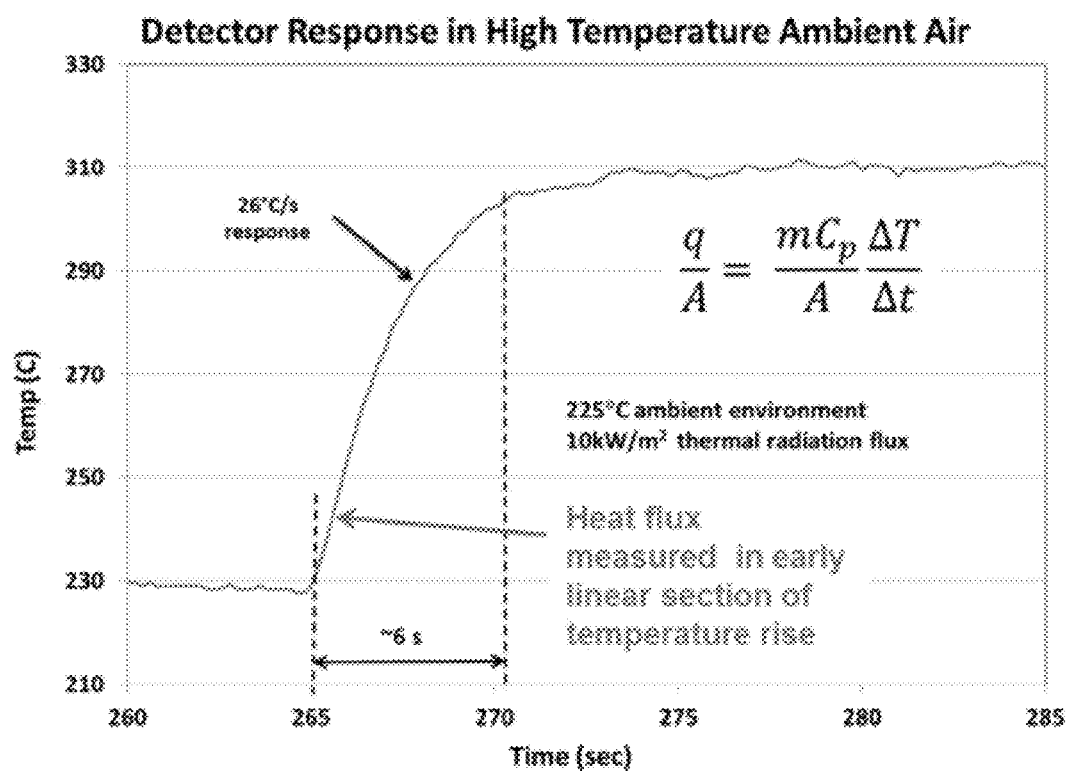
FIG. 32. Thermal response of TDA's radiant detection foil to a 10 kW/m² IR flux with the ambient air temperature at 260° C. (500° F.).
Figure 33:
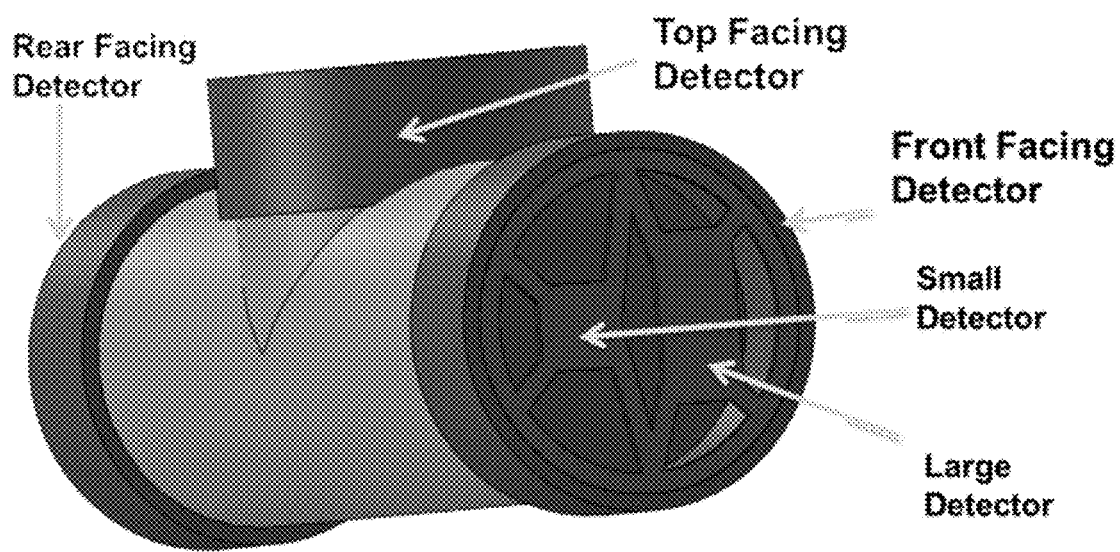
FIG. 33. Burn Saver Device. The sensor measures IR flux in three directions, front, back, and top. The front sensor has two elements in order to determine radiant heat flux and ambient temperature.

Calculating the radiative heat flux is done using the data from the front, top and back thin foil sensors (FIG. 33). Alternative designs are possible with more or fewer sensors in different direction. IR is directional because it is electromagnetic radiation. The heat flux ($kW/m^2$) is calculated (equation 12) the same way that we calibrated our IR source with the calorimeter except that our thermal masses (the foils) are much smaller than the mass of the blackened aluminum billet. In FIG. 32 the sensor foil heats up to steady state in about 6 seconds after the 10 kW//m² IR source is switched on, which gives a heating rate of 26° C./sec. The slope of the temperature vs. time curve is used to calculate the radiant heat flux using Equation 12.

Equation 12. Radiant heat flux from slope of T vs. t:

$$\text{Flux} = \left[\frac{\text{W}}{\text{m}^2}\right] = \frac{Q}{A} = \frac{m_{foil} C p_{foil} \frac{\Delta T}{\Delta t}}{A_{foil}}$$

The approach for determining whether a firefighter is in danger requires independently measuring the heat flux and ambient temperature, as per the fire classification scheme shown in FIG. 2. While calculating the IR flux is relatively straight forward, calculating the ambient temperature is much more difficult, especially in an environment filled with smoke, water and other materials that make it impossible to maintain clean surfaces (such as low $\epsilon$ surfaces that would only be heated convectively). To determine the ambient temperature, the device if the present invention uses identical emissivity coatings on two foils that have different surface areas which are mounted in proximity and on the front side of the Burn Saver (FIG. 33). By having different surface areas, the ambient temperature can be calculated because the convective heat transfer coefficients of the two foils are different. Equation 13 through Equation 17 shows the mathematical derivation of the ambient temperature ($T_A$) from the heat balance for the foils in terms of the two foil temperatures ($T_L$ and $T_S$), using empirically determined values of the heat transfer coefficients for the large ($h_L$) and small ($h_S$) foils. $T_D$ is the temperature of the detector housing.

At steady state, the heat into each sensor foil (given by Equation 13 and Equation 14) equals the heat out. Because the amount of heat transferred into each foil is proportional to the total surface area of the foil subjected to the IR radiation, the heat balances for each foil can be equated (Equation 15 and Equation 16) and the ambient temperature can be calculated (Equation 17) once the values for the large and small foil heat transfer coefficients are known. In the example device (FIG. 33), the larger of the two foil elements (0.25"×0.75") has an area that is approximately 3 times the area of the smaller foil (0.25"×0.25"). As a result, the heat transfer coefficients for the two foils are different enough to permit accurate calculation of the ambient air temperature.

Equation 13. Heat balance for larger foil:

$Q_L = \epsilon \sigma A_L (T_L^4) + h_L A_L (T_L - T_A) + K_L A_L T_L - T_D$

Equation 14. Heat balance for smaller foil:

$Q_S = \epsilon \sigma A_S (T_S^4) + h_S A_S (T_S - T_A) + K_S A_S T_S - T_D$

Equation 15. Relationship between heat into larger and smaller foils:

$$Q_L = \frac{A_L}{A_S} Q_S$$

Equation 16. Heat balance between foils:

$$\varepsilon\sigma(T_L^4) + h_L(T_L - T_A) + K_L T_L - T_D = \varepsilon\sigma(T_S^4) + (T_S - T_A) + K_S T_S - T_D$$

Equation 17. Calculation of ambient temperature:

$$T_A = \frac{\varepsilon\sigma(T_L^4 - T_S^4) - h_S T_S + h_L T_L - T_D(K_L - K_S) - K_S T_S + K_L T_L}{(h_L - h_S)}$$

With negligible conductive heat losses Equation 17 becomes Equation 18.

Equation 18. Simplified ambient temperature calculation:

$$T_A = \frac{\varepsilon\sigma(T_L^4 - T_S^4) - h_S T_S + h_L T_L}{(h_L - h_S)}$$

Definitions of the variables used in Equation 13 through Equation 18 are given in FIG. 34.

Example 4: Exemplary Means of Measuring the Temperature Output from the First Thermocouple and the Second Thermocouple Examples of means of measuring the temperature output include thermocouples, a preferred thermocouple being chromel-alumel, wires, voltmeters, voltage measuring devices, power sources to operate thermocouples and voltage measuring devices, formulas or tabulated data to convert measured voltages to a measured temperature based on known voltage output vs. temperature correlations or estimations.

Example 5: Exemplary Means of Performing Calculations Comprising Calculating the Rate of Temperature Change for Both the First Thermocouple and Second Thermocouple and then Determining the Heat Flux and the Ambient Temperature Using Formulas or Reference Tables Means of performing calculations include computers, personal computers, electronic monitoring chips, solid state electronics, hard-wired electronics and programmable electronic devices that are capable of operating the calculations in equation 12 and equation 18, and the like. Additional variations beyond the specific examples are possible. Typical air velocities in a fire vary from about 2 m/s to as high as 4-5 m/s (e.g. with ventilation) (Bryant 2009). The air flow can approach the front of the Burn Saver in many directions and velocities, which rapidly change. As a result, it is not possible to calculate heat transfer coefficients for the foil detectors from first principles. The approach in the present invention is to empirically determine the heat transfer coefficients for the large and small foils on the front of the Burn Saver under controlled, known conditions by fitting experimental data (FIG. 35), and then use those values of h to calculate the ambient temperature when the device is being used in different conditions. Using this approach with relatively high air flow rates (e.g. 4 m/s) the calculated ambient temperature can be accurate to less than ±10° C., (FIG. 36). In the above example a personal computer was used as the means of calculating, however know equivalents may be substituted.

Figure 35:
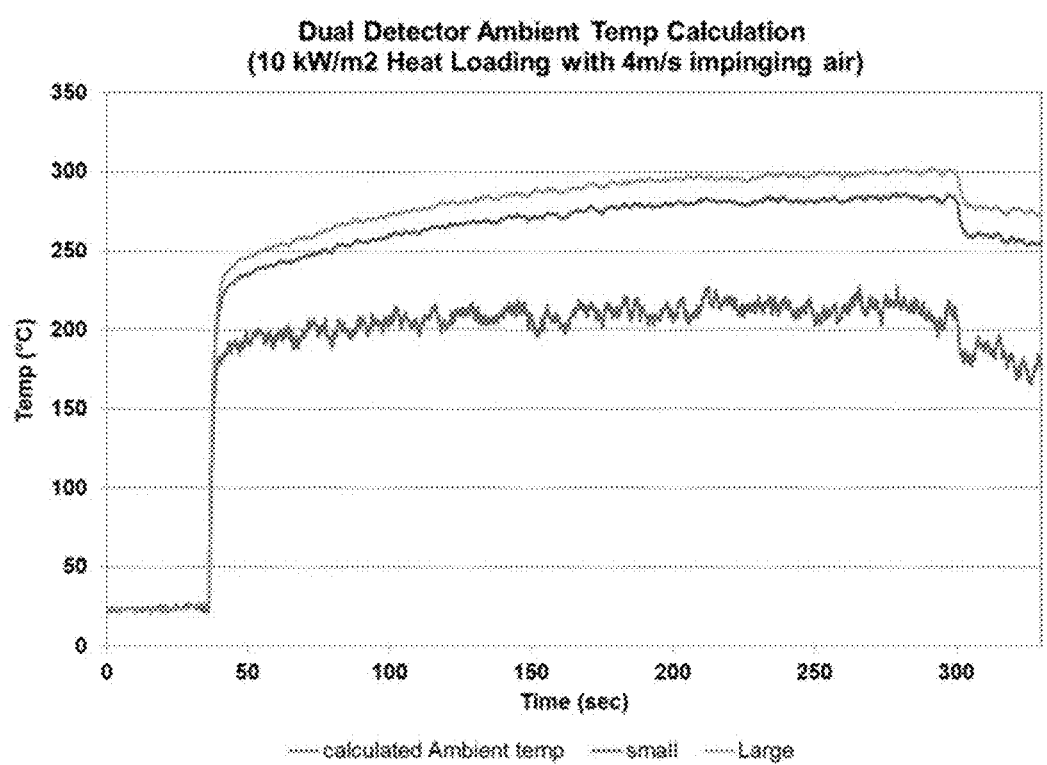
FIG. 35. Known conditions for calculating the heat transfer coefficients for the large and small foils from the experimental data.
Figure 36:
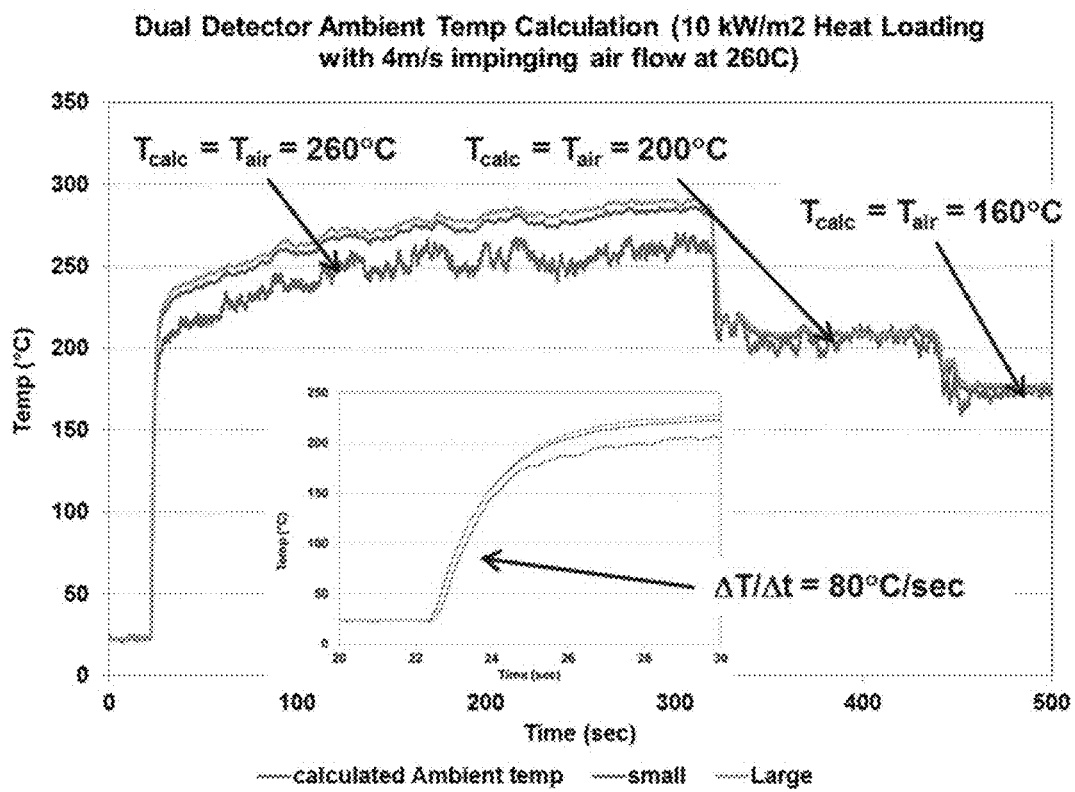
FIG. 36. Results of ambient air temperature tests at 260° C. and 160° C. using heat transfer coefficients determined at 200° C. for calculating the ambient temperature using Equation 18 for 4 m/s air velocity.

In FIG. 35, the actual air temperature was T=200° C. Air from a heat gun that was calibrated with an anemometer to produce a velocity of 4 m/s was then directed toward the two sensor foils with the direction of flow perpendicular to the foils. At the same time that the heat gun was started, the IR lamp was turned on producing a heat flux of 10 kW/m². The temperature of each foil was then recorded as a function of time (FIG. 35).

Figure 37:
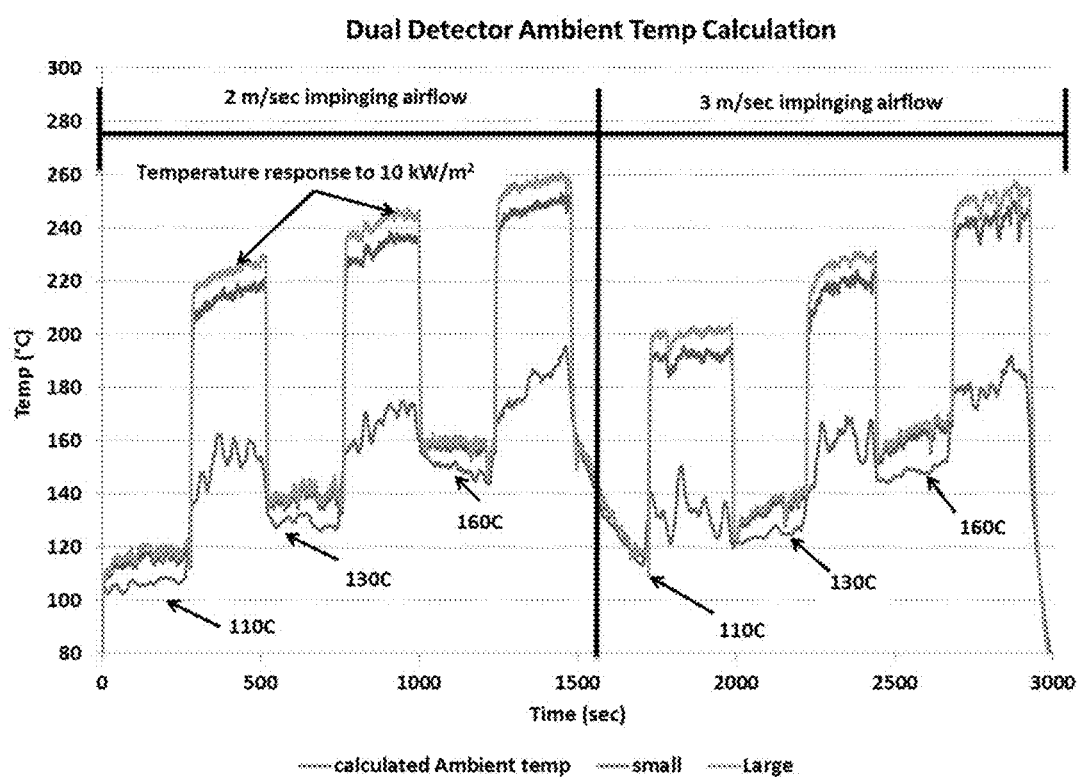
FIG. 37. Results of ambient air temperature tests at 110° C., 130° C. and 160° C. for air velocities of 2 m/s (left) and 3 m/s (right) using heat transfer coefficients determined at 200° C. for calculating the ambient temperature using Equation 17.

With the data in an Excel spreadsheet, Equation 18 was used to calculate the ambient temperature with the heat transfer coefficients for the large and small foils being adjusted until the calculated ambient air temperature was equal to the known air temperature of 200° C. Subsequently, the experiment was repeated using air from the heat gun at 260° C. (500° F.) and 160° C. (320° F.) and the ambient temperature was calculated using Equation 18 using the same heat transfer coefficients that we empirically determined at 200° C. FIG. 36 shows that the predicted ambient temperature was within ±10° C. (±18° F.) of the actual value. Since this represents the higher end of the air velocities observed in fires, we repeated these experiments at lower air velocities, including 2 m/s. The results of those experiments are shown in FIG. 37. The ambient air temperatures were 110° C., 130° C. and 160° C., and the air velocities were 2 m/s and 3 m/s. As the air velocity decreases, the values of the actual (not assumed) heat transfer coefficients decrease which decreases $h_L - h_S$ in the denominator of Equation 18 and increases the absolute error. Nevertheless, even at a low air flow of 2 m/s (4.5 mph) the accuracy is still within about 30° C. (54° F.). As expected the accuracy of the calculated ambient temperature is better at the higher velocity of 3 m/s-about 25° C. (45° F.). This level of accuracy is sufficient for alarm purposes in the Burn Saver and therefore eliminates the need for complicated temperature measurements with devices such as aspirated thermocouples (which work extremely well when very accurate temperature measurements are needed, but are not portable due to the bulky ancillary equipment needed such as pumps).

In should be understood by a Person Having Ordinary Skill in The Art that the above equations can be replaced by a means of calculating comprising a reference table and an iterative calculation.

Example 6: Exemplary Means of Alerting a Person of Hazardous Fire Conditions Based on the Calculated Heat Flux and Ambient Temperature The means of calculating the temperature and heat flux, and the corresponding thermal hazards, is operably connected to the means of alerting. For example, the computer (or alternative equivalent such as listed above), after a particular hazard has been determined, can send a signal to a light, a lamp, an light emitting diode, a speaker, a vibrator, or the like, to warn the firefighter of the danger.

Although the present invention has been described in considerable detail with reference to certain preferred versions thereof, other versions are possible. For example, other sensor shapes or materials are possible and other sensor body configurations are possible such as forward facing only, forward and backward facing. Therefore, the spirit and scope of the appended claims should not be limited to the description of the preferred versions contained herein.

The reader's attention is directed to all references which are filed concurrently with this specification and which are incorporated herein by reference.

All the features in this specification (including any accompanying claims, abstract, and drawings) may be replaced by alternative features serving the same, equivalent or similar purpose, unless expressly stated otherwise. Thus, unless expressly stated otherwise, each feature disclosed in one example only of a generic series of equivalent of similar features. Any element in a claim that does not explicitly state "means for" performing a specified function, or "step for" performing a specific function, is not to be interpreted as a "means" or "step" clause as specified in 35 U.S.C. §112 ¶6 or 35 U.S.C. §112 (f).

The present invention provides a sensor system for use in a Burn Saver device that responds in to changes in thermal radiation. The device may have a rapid response in <10 sec and to changes in ambient air temperature in <2 minutes. Thermal IR presents the greatest hazard because it can change rapidly to very high levels. The device measures the radiative heat flux using the rate of temperature increase as a function of time and Equation 12. Measuring the ambient air temperature is more difficult because in the dirty firefighting environment, all types of temperature measuring devices can become coated with soot, smoke, water etc. Thus, the present invention provides a means to calculate the ambient air temperature based on the differences in convective heating for two different sized thin foils that are exposed to the same IR flux. Based on the heat balance the device can calculate the ambient air temperature using Equation 17 and Equation 18. For this to work, however, the convective heat transfer coefficients for the large and small foils under well controlled conditions must first be empirically determined and then values are used as constants in Equation 17 and Equation 18, by the device. With measures of the radiant heat flux (kW/m$^2$) and the ambient temperature ($T_A$), the Burn Saver device can assess the thermal hazard as per the fire classification method described by Mensch et al. 2011, and Donnelly et al. 2006. Their classification in turn, gives a maximum amount of time for the firefighter to spend in that environment without danger of PPE failure (in particular the face piece of the SCBA). Because the Burn Saver device will work in the smoky and soot filled fire environments where other temperature measuring equipment fails, the Burn Saver is the first device that is portable and inexpensive enough for each firefighter to carry with them in the field. As a result, the Burn Saver could significantly increase firefighter safety.

What is claimed is:

1. A decoupling radiant and convective heat sensing device, comprising:
   a. a first sensor, wherein the first sensor is a thin, high thermal conductivity body, and wherein the first sensor has a first surface area, an obverse side a reverse side, a mass and a heat capacity;
   b. a first high emissivity surface coating on the obverse side;
   c. a first thermocouple operably connected to the reverse side;
   d. a second sensor, wherein the second sensor is a thin, high thermal conductivity body, and wherein the second sensor has a second surface area, a second sensor obverse side, a second sensor reverse side, a second sensor mass and a second sensor heat capacity;
   e. a second high emissivity surface coating on the second sensor obverse side;
   f. a second thermocouple operably connected to the second sensor reverse side;
   wherein, the first surface area is larger than the second surface area, and wherein the first sensor and the second sensor are mechanically coupled;
   g. a means for measuring a temperature output from the first thermocouple and the second thermocouple;
   h. a means for performing calculations comprising calculating a rate of temperature change for both the first thermocouple and second thermocouple and determining a heat flux and an ambient temperature using formulas or reference tables; and
   i. a means for alerting a person of hazardous fire conditions based on the heat flux and the ambient temperature;
   wherein the first high emissivity coating and the second high emissivity coating have essentially equivalent emissivity, and wherein the means for performing calculations comprises an equation:

$$T_A = \frac{\varepsilon\sigma(T_L^4 - T_S^4) - h_S T_S + h_L T_L}{h_L - h_S}$$

and an equation:

$$\text{Flux} = \frac{m_{foil} Cp_{foil} \frac{\Delta T}{\Delta t}}{A_{foil}}$$

wherein, $T_A$ is the ambient temperature, c is the emissivity of first and second high emissivity coating, σ is Boltzmann constant, $T_L$ is the temperature of the first sensor, $T_S$ is the temperature of the second sensor, $h_S$ is the thermal conductivity of the second sensor, $h_L$ is the thermal conductivity of the first sensor, m is the mass of the first sensor, $C_P$ is the heat capacity of the first sensor, A is the surface are of the first sensor, and ΔT/Δt is a slope of a plot of the temperature of the first thermocouple as a function of time.

2. The device of claim 1 wherein, $h_S$ and $h_L$ are constants.

* * * * *